US008689599B2

(12) United States Patent
Green

(10) Patent No.: US 8,689,599 B2
(45) Date of Patent: Apr. 8, 2014

(54) CLAMP AND REPAIR TOOL

(71) Applicant: Timberline Tool, L.L.C., Kalispell, MT (US)

(72) Inventor: Kenneth H. Green, Whitefish, MT (US)

(73) Assignee: Timberline Tool, L.L.C., Kalispell, MT (US)

( * ) Notice: Subject to any disclaimer, the term of this patent is extended or adjusted under 35 U.S.C. 154(b) by 15 days.

(21) Appl. No.: 13/668,882

(22) Filed: Nov. 5, 2012

(65) Prior Publication Data

US 2013/0126030 A1 May 23, 2013

Related U.S. Application Data

(63) Continuation-in-part of application No. 12/778,825, filed on May 12, 2010, now Pat. No. 8,316,684, which is a continuation-in-part of application No. 11/866,706, filed on Oct. 3, 2007, now Pat. No. 8,122,751, which is a continuation of application No. 10/926,366, filed on Aug. 25, 2004, now Pat. No. 7,337,648.

(60) Provisional application No. 60/498,612, filed on Aug. 28, 2003.

(51) Int. Cl.
*B21D 7/06* (2006.01)

(52) U.S. Cl.
USPC .............. 72/416; 72/409.19; 72/418; 72/419; 72/421; 72/451; 72/454; 29/237; 29/283; 269/228; 269/268

(58) Field of Classification Search
USPC .............. 72/409.1, 409.12, 409.19, 416, 418, 72/419, 421, 451, 454; 29/237, 283; 269/228, 256, 268, 270

See application file for complete search history.

(56) References Cited

U.S. PATENT DOCUMENTS

| 232,428 A | 9/1880 | Whiting |
| 243,480 A | 6/1881 | Whiting |
| 455,414 A | 7/1891 | Searle |
| 458,176 A | 8/1891 | Lemp |
| 1,100,067 A | 6/1914 | Fish |

(Continued)

FOREIGN PATENT DOCUMENTS

| DE | 33 35 728 | 4/1985 |
| EP | 0 532 391 | 3/1993 |

(Continued)

*Primary Examiner* — David B Jones
(74) *Attorney, Agent, or Firm* — Dorsey & Whitney LLP; Wendy N. Peterson, Esq.

(57) ABSTRACT

A system for repairing a pipe including a tool, a programmable logic controller and a patch. The tool includes a clamp base having an opening, a first jaw coupled to the clamp base with a first linkage, a second jaw coupled to the clamp base with a second linkage, an operating mechanism carried by the clamp base and operably coupled to the first and second jaws via one or more adjusting links and a junction box carried by the clamp base and operably connected to the controller, wherein the one or more adjusting links are coupled at a first end to either or both of the first and second jaws and at a second end to the operating mechanism, and wherein the first and second jaws are adapted to move, under force of the adjusting links. Methods of repairing pipes are disclosed.

26 Claims, 18 Drawing Sheets

(56) References Cited

U.S. PATENT DOCUMENTS

| | | |
|---|---|---|
| 1,817,988 A | 8/1931 | Klamt |
| 2,241,021 A | 5/1941 | Riebe |
| 2,283,933 A | 5/1942 | Jones et al. |
| 2,850,926 A | 9/1958 | Jobe |
| 2,853,908 A | 9/1958 | Logan |
| 3,117,904 A | 1/1964 | Black |
| 3,170,322 A | 2/1965 | Cavanaugh |
| 3,266,287 A | 8/1966 | Gill |
| 4,534,817 A | 8/1985 | O'Sullivan |
| 4,574,610 A | 3/1986 | Hull et al. |
| 4,650,236 A | 3/1987 | Haney |
| 4,900,078 A | 2/1990 | Bloch |
| 4,943,684 A | 7/1990 | Kramer |
| 5,107,095 A | 4/1992 | Derbyshire |
| 5,119,665 A | 6/1992 | Stafford |
| 5,382,313 A | 1/1995 | Eminger |
| 5,598,736 A * | 2/1997 | Erskine .......... 72/389.6 |
| 5,634,362 A * | 6/1997 | Tomita .......... 72/31.05 |
| 5,678,441 A * | 10/1997 | Schwarze .......... 72/149 |
| 5,971,378 A | 10/1999 | Sweeney |
| 6,450,555 B1 | 9/2002 | Collister et al. |
| 6,655,417 B2 | 12/2003 | Kurmis |
| 6,707,007 B1 | 3/2004 | Siddoway |
| 6,941,628 B1 | 9/2005 | Silverfox |
| 7,337,648 B2 | 3/2008 | Green |
| 2008/0026214 A1 | 1/2008 | Green |
| 2009/0050256 A1 | 2/2009 | Green |

FOREIGN PATENT DOCUMENTS

| | | |
|---|---|---|
| EP | 0 779 465 | 6/1997 |
| EP | 2 128 512 | 12/2009 |
| FR | 2 231 916 | 12/1974 |
| FR | 2 613 811 | 10/1988 |
| FR | 2 728 494 | 6/1996 |
| JP | 60-110792 | 7/1985 |
| JP | 04-048406 | 4/1992 |
| WO | WO 2005/023494 | 3/2005 |
| WO | WO 2006/083857 | 8/2006 |

* cited by examiner

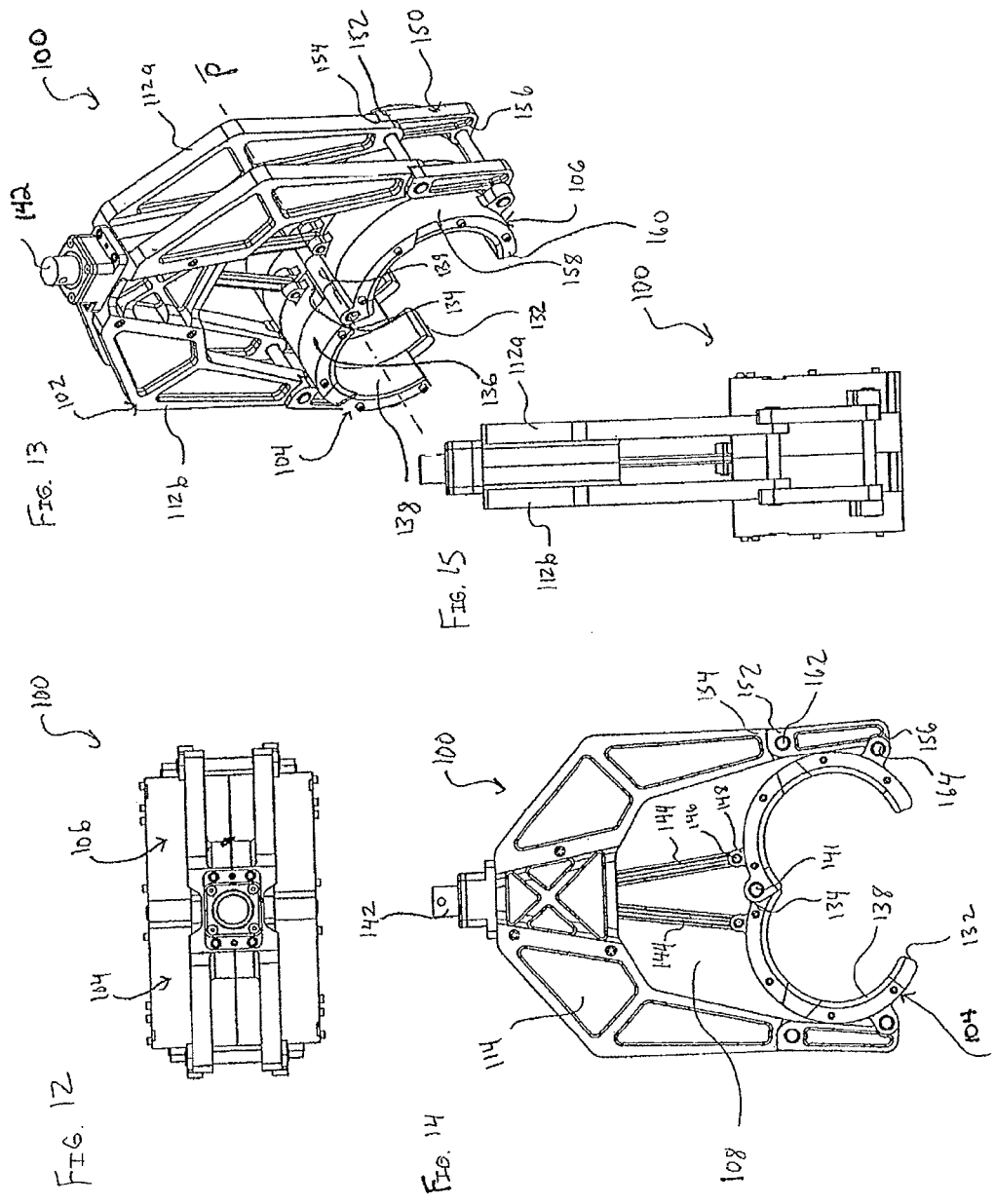

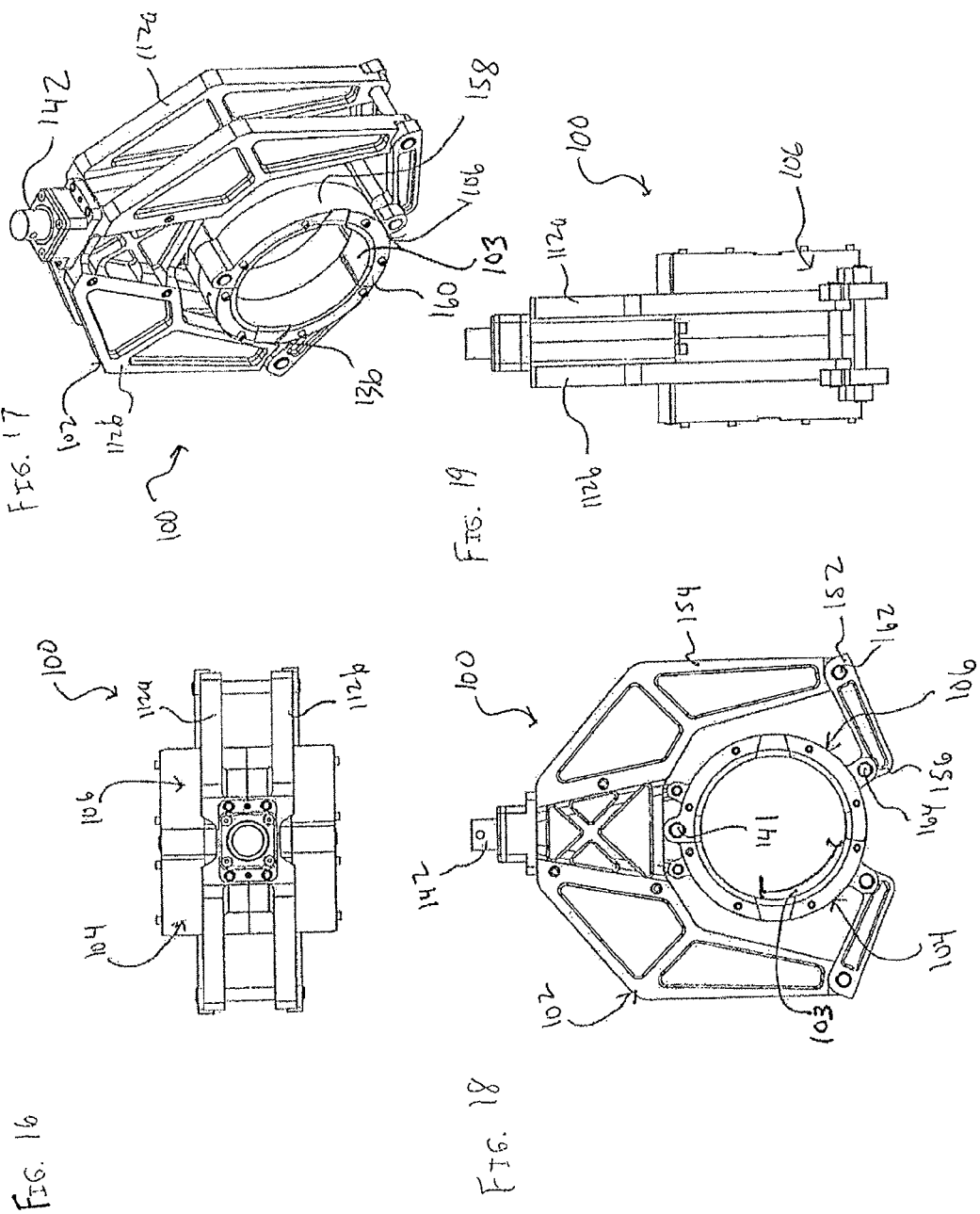

CLAMP AND REPAIR TOOL

BACKGROUND

The present invention relates to tools, including clamping, holding and gripping type tools. More specifically, the present invention relates to clamping, holding and gripping type tools, including such tools adapted to apply a treatment to a workpiece. In some embodiments, the treatment may be selected as suitable for the workpiece to be held, clamped or gripped and for the effect sought.

Various circumstances require a clamping tool. Repair, joining or sealing conduits, pipes and the like or other workpieces may be facilitated by clamping. Often, it is advantageous to pinch or otherwise block piping through which fluid is moving. For example, a utility crew may expose a portion of a natural gas line to perform maintenance or some other type of work. The utility crew cannot access the pipe without controlling the flow of the fluid, yet it may be difficult and disruptive to cease flow to that entire line. Thus, a clamp is often used to pinch the pipe or otherwise block the piping to stop fluid flow from that point forward.

Alternatively, a clamping tool may be used to clamp a pipe or conduit and apply a treatment thereto, without disturbing the flow of the fluid through the pipe or conduit.

A number of tools have been created to address these tasks. Some of the difficulties common to these tools include positioning of the tool around the pipe within a confined area, clamping the pipe without expelling it from the tool, providing a configuration offering sufficient force to compress the pipe, and providing a treatment to the pipe. These difficulties act individually and collectively to make it more difficult to use a clamping tool to secure a pipe or conduit and stop fluid flow through the pipe or conduit.

Generally, when securing a pipe to stop fluid flow through the pipe, only a small area is provided to work in. For example, a trench may be dug through the ground to reveal a small segment of the pipe. This can make it difficult to access the pipe, to reach the pipe (it may be several feet below ground level), and to engage the pipe with a tool. Because of the generally cylindrical shape of pipes, the strength of pipes, and the typical "scissoring" (i.e., angled closing) effect of clamping tools, pipes often become expelled from the clamping tool as the tool is actuated. That is, the pipe may not be easy to compress and, as the tool closes, the angled closing may cause the tool to disengage rather than clamping the pipe.

The small workspace, the resistance of the pipe to clamping, and the depth of the pipe in the ground make it difficult to provide a tool that an operator can use to develop sufficient force to apply a treatment to a pipe or to stop fluid flow through the pipe. Traditionally, when manually operated tools are needed to exert a greater force, a longer lever arm is provided. However, such a solution, in this context, is impractical for the reasons previously noted.

In some applications, it would be helpful if a radially directed force could be applied substantially completely and uniformly around a workpiece using a clamping or gripping type tool. This is difficult with a traditional scissor type jaw movement, or with clamp type tools having the typical generally flat jaw surfaces.

Thus, there exists a need to provide an improved clamping tool.

SUMMARY

In one aspect, the present disclosure includes a tool comprising a clamp base having an opening, a first jaw coupled to the clamp base with a first linkage, the first jaw comprising a first generally semi-cylindrical portion having a first curvilinear support surface, the first curvilinear support surface extending between a top end and a bottom end and shaped to complement a selected generally tubular workpiece, a second jaw coupled to the clamp base with a second linkage, the second jaw comprising a second generally semi-cylindrical portion having a second curvilinear support surface, the second curvilinear support surface extending between a top end and a bottom end and shaped to complement a selected generally tubular workpiece, an operating mechanism carried by the clamp base and operably coupled to the first and second jaws via one or more adjusting links, a programmable logic controller, and a junction box carried by the clamp base and operably connected to the controller, wherein the one or more adjusting links are coupled at a first end to either or both of the first and second jaws and at a second end to the operating mechanism, and wherein the first and second jaws are adapted to move, under force of the adjusting links, within the opening between an open position in which the bottom ends of the first and second jaws are spaced apart to a closed position in which said bottom ends are abutting.

In various embodiments, the first jaw further comprises a first inner layer overlapping at least a portion of the first curvilinear support surface and defines a first workpiece contacting surface, and the second jaw further comprises a second inner layer overlapping at least a portion of the second curvilinear surface and defines a second workpiece contacting surface. In other embodiments, the inner layer comprises an insulating material. In one embodiment, the insulating material comprises nylon.

In some embodiments, the tool comprising inner layers further comprises a first removable diameter insert and a second removable insert, said first removable insert overlapping at least a portion of the first workpiece contacting surface and the second removable insert overlapping at least a portion of the second workpiece contacting surface.

In some embodiments, the tool further comprises a handle coupled to the operating mechanism, wherein the adjusting links are extendable from and retractable into the clamp assembly via movement of said handle.

In various embodiments, the clamp base is generally U-shaped, and the first and second jaws are disposed proximate to an open end of the U-shaped base.

In another embodiment, the bottom end of the first jaw comprises a stepped profile that meshes with a stepped profile of the second jaw such that at least a portion of the first and second jaws overlap. In other embodiments, the one or more adjusting links are coupled on their first ends to an outer surface of the first jaw or the second jaw. In one embodiment, the first and second jaws are movable within the opening such that, collectively, the first and second workpiece contacting surfaces contact a generally cylindrical workpiece substantially completely around the outer diameter of the cylindrical workpiece.

In various embodiments, the tool comprising inner layers, further comprises a patch to be applied to the selected workpiece, the patch carried by either or both of the first and second jaws. In some embodiments, the patch is operably connected to the junction box by a coupling device. In one embodiment, the coupling device comprises one or more electrical leads, and the patch further comprises a heating element embedded therein, the heating element coupled to the one or more electrical leads.

In another aspect, the present invention includes a tool comprising a clamp base having an opening, a first jaw coupled to the clamp base with a first linkage, the first jaw comprising a first generally semi-cylindrical portion having a first curvilinear surface, the first curvilinear surface extending between a top end and a bottom end and shaped to complement a selected generally tubular workpiece, the first jaw further comprising a first insulating layer overlapping at least a portion of the first curvilinear surface and defining a first workpiece contacting surface, a second jaw coupled to the clamp base with a second linkage, the second jaw comprising a second generally semi-cylindrical portion having a second curvilinear surface, the second curvilinear surface extending between a top end and a bottom end and shaped to complement a selected generally tubular workpiece, the second jaw further comprising a second insulating layer overlapping at least a portion of the second curvilinear surface and defining a second workpiece contacting surface, a programmable logic controller, and a junction box carried by the clamp base and operably connected to the controller, wherein the first and second jaws move within the opening between an open position in which the bottom ends of the first and second jaws are spaced apart to a closed position in which the said bottom ends of the first and second jaws are abutting.

In some embodiments, the first and second insulating layers comprise nylon.

In various embodiments, the tool further comprises a first removable diameter insert and a second removable insert, said first removable insert overlapping at least a portion of the first workpiece contacting surface and the second removable insert overlapping at least a portion of the second workpiece contacting surface.

In one embodiment, the clamp base is generally U-shaped, and the first and second jaws are disposed proximate to an open end of the U-shaped base.

In some embodiments, the bottom end of the first jaw comprises a stepped profile that meshes with a stepped profile of the second jaw such that at least a portion of the first and second jaws overlap. In other embodiments, the first and second jaws are movable within the opening such that, collectively, the first and second workpiece contacting surfaces contact a generally cylindrical workpiece substantially completely around the outer diameter of the cylindrical workpiece.

In various embodiments, the tool further comprises an operating mechanism disposed on or within the clamp base operatively coupled to the first and second jaws via one or more adjusting links, wherein the one or more adjusting links are coupled on a first end to either or both of the first and second jaws and on a second end to the operating mechanism such that the adjusting links are extendable from and retractable into the clamp assembly via movement of a handle coupled to the operating mechanism. In other embodiments, the one or more adjusting links are coupled on their first ends to an outer surface of the first jaw or the second jaw.

In some embodiments, the tool further comprises a patch to be applied to the selected workpiece, the patch carried by either or both of the first and second jaws. In various embodiments, the patch is operably connected to the junction box by a coupling device. In another embodiment, the coupling device comprises one or more electrical leads, and the patch further comprises a heating element embedded therein, the heating element coupled to the one or more electrical leads.

In one aspect, the present disclosure includes, a system including a tool comprising, a clamp base having an opening, a first jaw coupled to the clamp base defining a first workpiece contacting surface, a second jaw coupled to the clamp base defining a second workpiece contacting surface, and a junction box carried by the clamp base, a programmable logic controller operably connected to the junction box, and a patch to be applied to a workpiece, operably coupled to the junction box.

In various embodiments, the system further comprises at least one insert for use with the tool. In some embodiments, a first insert overlaps at least a portion of the first workpiece contacting surface and a second insert overlaps at least a portion of the second workpiece contacting surface. In one embodiment, the insert(s) comprises nylon. In another embodiment, the insert(s) is removable.

In some embodiments, the patch is contacted by an inner surface of the at least one insert. In other embodiments, the patch is operably connected to the junction box by a coupling device. In various embodiments, the coupling device comprises one or more electrical leads, and the patch further comprises a heating element embedded therein, the heating element coupled to the one or more electrical leads.

In other aspects, methods of repairing a pipe are disclosed below.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the accompanying drawings and this description are to be regarded as illustrative, not restrictive.

BRIEF DESCRIPTION OF THE DRAWINGS

FIG. 12 is a top view of a clamping tool in accordance with some embodiments.

FIG. 13 is a perspective view of a clamping tool in accordance with some embodiments.

FIG. 14 is a side view of a clamping tool in accordance with some embodiments.

FIG. 15 is a side view of a clamping tool in accordance with some embodiments.

FIG. 16 is a top view of a clamping tool in accordance with some embodiments.

FIG. 17 is a perspective view of a clamping tool in accordance with some embodiments.

FIG. 18 is a side view of a clamping tool in accordance with some embodiments.

FIG. 19 is a side view of a clamping tool in accordance with some embodiments.

DETAILED DESCRIPTION

Any reference to "the invention" herein shall not be construed as a generalization, limitation or characterization of any subject matter disclosed herein and shall not be considered to be an element or limitation of the appended claims except if and/or where explicitly recited in a claim(s). With regard to fastening, mounting, attaching or connecting components of the present invention to form a tool as a whole, unless specifically described otherwise, such are intended to encompass conventional fasteners such as threaded connectors, snap rings, detent arrangements, rivets, toggles, pins, and the like. Components may also be connected by adhesives, glues, welding, ultrasonic welding, and friction fitting or deformation, if appropriate. In embodiments wherein electricity is involved, for example for electrical heating of a workpiece, suitable connections may be provided, along with a suitable power source or connectors for connecting to a power source. In embodiments with electrical features or components, suitable electrical components and circuitry, wires, wireless components, chips, boards, microprocessors, inputs, outputs, displays, control components, etc. may be used. Unless specifically otherwise disclosed or taught, materials for making components of the present invention may be selected from appropriate materials such as metal, metallic alloys, vinyls, plastics and the like, and appropriate manufacturing or production methods including casting, pressing, extruding, molding and machining may be used. Any references to front and back, right and left, top and bottom, and upper and lower are intended for convenience of description, not to limit the present invention or its components to any one positional or spatial orientation. Same reference numbers are used to denote same parts or components.

The accompanying Figures illustrate a clamping tool including a clamping assembly coupled with a handle. The handle may be permanently coupled to the assembly or may be removable, and it may have any selected length.

Figure 1:
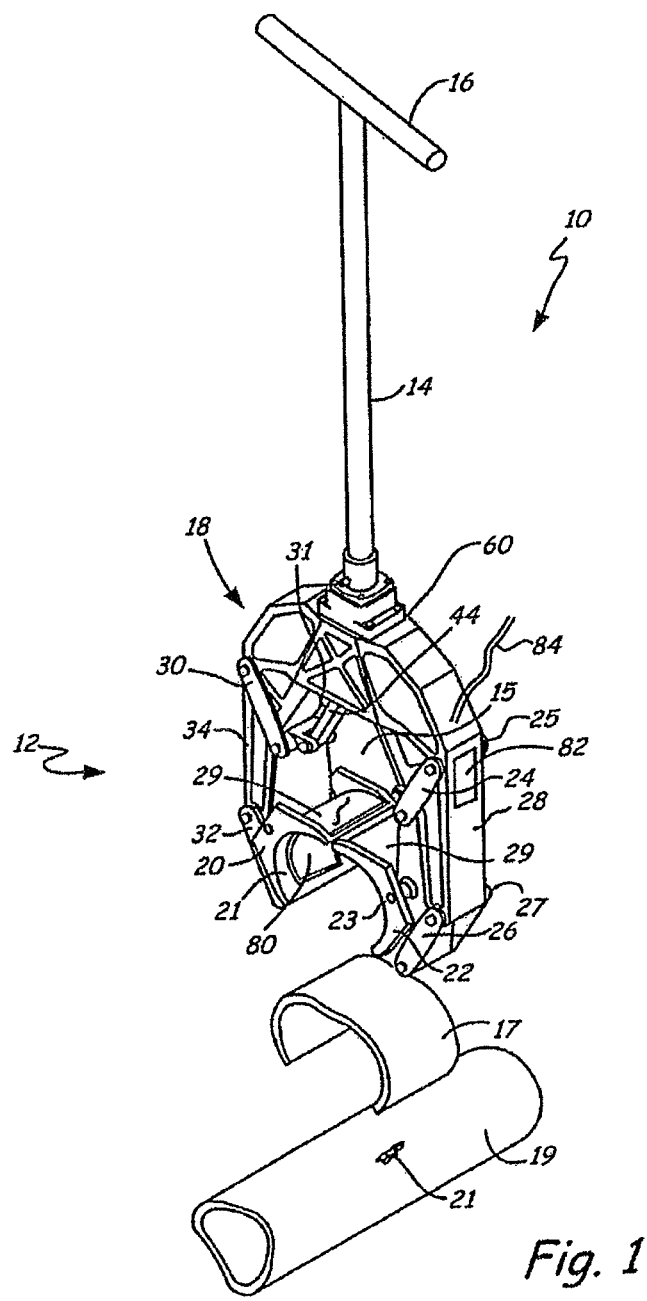
FIG. 1 is a perspective view of a clamping assembly of a clamping tool in accordance with one embodiment of the present invention in an open position.

FIG. 1 illustrates a clamping tool 10. The clamping tool 10 includes a clamping assembly 12 coupled with an extension tube 14. A handle 16 is rotatably coupled to the extension tube 14. In use, the handle 16 is rotated in one direction to cause the clamping assembly 12 to open and is rotated in the opposite direction to cause the clamping assembly 12 to close. Alternate handle configurations may be used in accordance with the present invention. That is, it is not necessary that the handle be rotatable. For example, the handle may be a push handle or a lever handle. As shown, the clamping assembly 12 is in an open position. The handle 16 may be permanently coupled with the extension tube 14 or may be removable. In one embodiment, extension tube 14 includes a standard sized bolt head so that a socket driver and socket can be use as the handle 16. Thus, different lengths of the handle 16 or extension tube 14 can be utilized depending upon the amount of force that will be required or the distances involved (e.g., the depth of a trench). As shown, the clamping tool 10 is positioned to apply a treatment 17 to a workpiece 19, the workpiece 19 having a gash 21 in the surface thereof.

Figure 2:
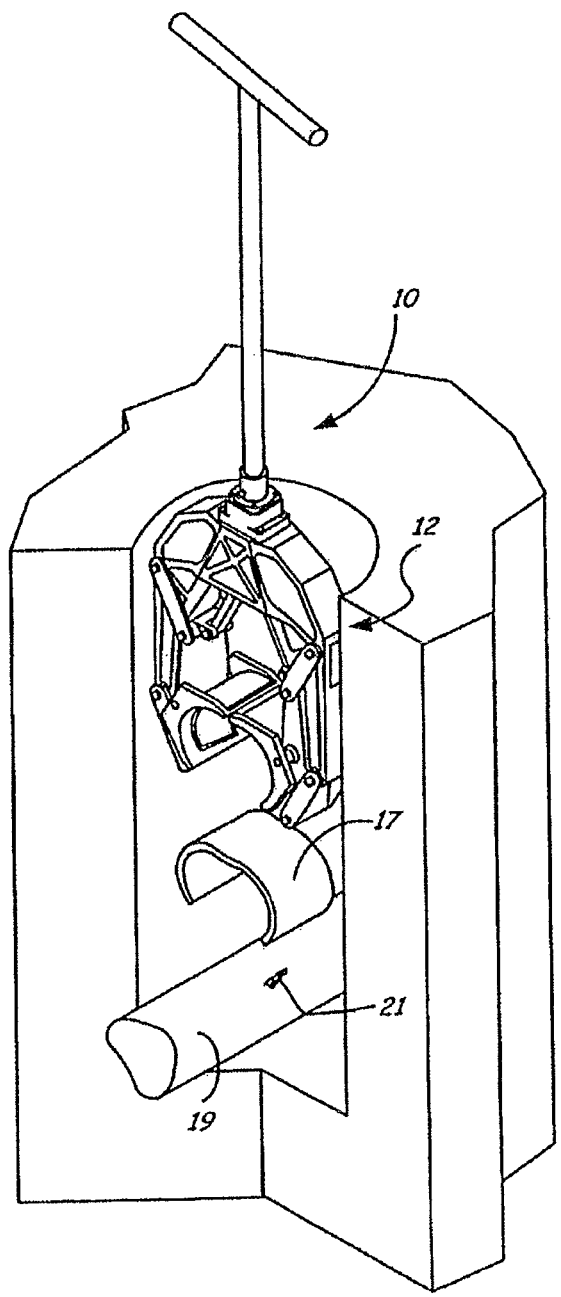
FIG. 2 is a perspective view of a clamping assembly of a clamping tool in accordance with one embodiment of the present invention in an open position being used in a narrow access.

FIG. 2 illustrates the clamping tool 10 of FIG. 1, also in a closed position, in use in a narrow space.

As shown in FIGS. 1 and 2, the clamp assembly 12 includes a clamp base 18. The clamp base 18 is a rigid structural element having a clamp base opening 15 defined therein. A pair of moveable jaws are defined by first movable jaw 20 and a second movable jaw 22. In an alternate embodiment, a single movable jaw may be provided parallel to a relatively stationary structure or a movable structure formed as, for example, a block. Portions of the first and second movable jaws 20 and 22 may be designed to be reflective during use.

One or both of the first and second jaws 20 and 22 may be provided with a moveable jaw portion for accommodating workpieces of various sizes.

Each of the first and second jaws 20 and 22 include a working surface 21 and 23 for contacting the workpiece 19. As shown, the first and second movable jaws 22 may be configured to conform to the workpiece 19. Thus, as shown, the working surfaces 21 and 23 together form a generally cylindrical shape for grasping a workpiece 19 such as a pipe.

In some embodiments, a plurality of interchangeable workpiece contacting surface members may be provided with the clamping tool 10, wherein a member or members fitting or conforming to a workpiece may be selected from the set and removeably connected to the tool 10. Thus, while generally cylindrical workpiece contacting surface members are shown, alternative shapes may be provided.

To cause the jaws to remain parallel, a "four bar linkage" may be utilized. Of course, any other suitable linkage may be utilized. The first movable jaw 20 forms one bar of the four bar linkage, and is pivotably coupled to the clamp base 18 by a top link 30 and a bottom link 32, forming two more bars of the four bar linkage. Though not clearly shown, another top link 31 and another bottom link 33 couple the first movable jaw 20 to the clamp base 18 and are located behind the assembly, as illustrated. Thus, the two top links 30, 31 form one "bar" of the "four bar linkage" and the two bottom links 32, 33 form another "bar" of the "four bar linkage." The fourth bar is formed by a portion of the clamp base 18, and is denoted as the base link 34.

Like the first movable jaw 20, the second movable jaw 22 is coupled to the clamp base 18 through a four bar linkage. Top links 24, 25 and bottom links 26, 27 are provided along with base link 28 to form the four bar linkage with second movable jaw 22.

As shown, top surfaces 29 of each of the first and second jaws 20 and 22 contact one another. In both the open position and the closed position (seen in FIGS. 3 through 5), the top surfaces 29 of each of the first and second jaws 20 and 22 contact one another to form an extension between the first and second jaws 20 and 22. Thus, the tool 10 can be set down on top of or around a pipe in a relatively confined space. The congruent top surfaces 29 keep the pipe positioned between the jaws 20, 22, and in some embodiments centered between the jaws 20, 22. The congruent top surfaces 29 and the shaped working surfaces 21, 23 together and independently keep the pipe positioned. The pipe generally extends in an axial direction between the jaws 20, 22. The clamping tool 10 is brought into position in a direction normal to the pipes axial length. The congruent top surfaces 23 aid in keeping the pipe properly positioned and the arrangement of the jaws 20, 22 generally prevent the tool from moving off of the pipe and prevent the pipe from moving out of the jaws 20, 22 in cases where such movement might be possible.

To close the jaws, adjusting links 44, 46 are retracted into clamp base 18. As this occurs, the first movable jaw 20 and the second movable jaw 22 are raised. Because of the pivoting top links 30, 31, 24, 25 and the pivoting bottom links 32, 33, 26, 27, the first movable jaw 20 and the second movable jaw 22 move towards one another. To open the jaws, the process is reversed. That is, the adjusting links 44, 46 are extended out of the clamp base 18. This causes the jaws 20, 22 to move in a direction away from extension tube 14 and to separate from one another.

Figure 3:
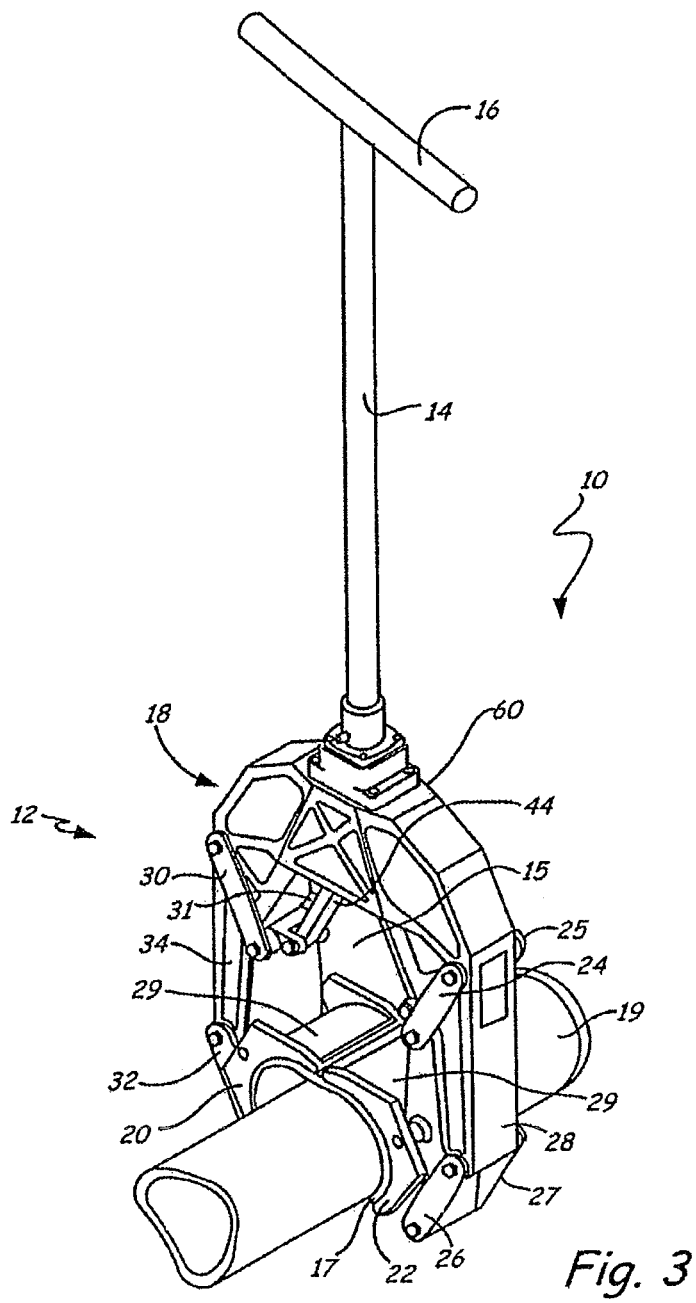
FIG. 3 is a perspective view of a clamping assembly of a clamping tool in accordance with one embodiment of the present invention in a closed position.
Figure 4:
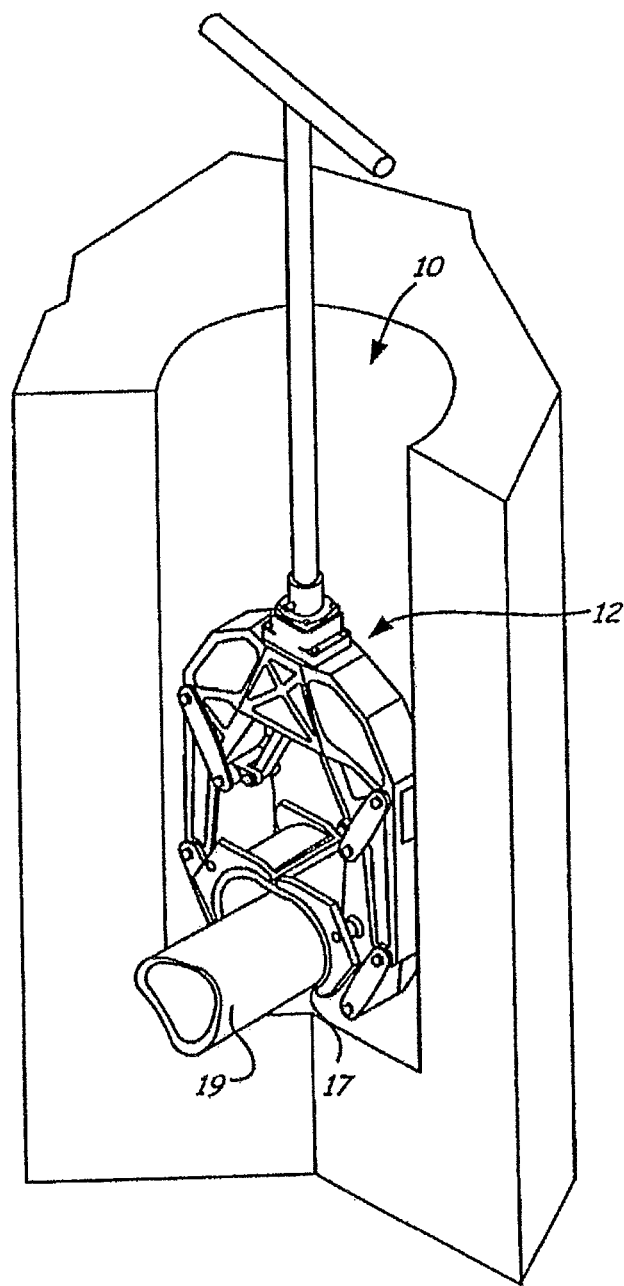
FIG. 4 is a perspective view of a clamping assembly of a clamping tool in accordance with one embodiment of the present invention in a closed position being used in a narrow access.

FIG. 3 illustrates a clamp assembly 12 with the clamping tool 10 being put into a closed position around a workpiece 19. FIG. 4 illustrates the clamp assembly with the clamping tool 10 being put in a closed position around a workpiece 19 being used in a narrow space.

Figure 5:
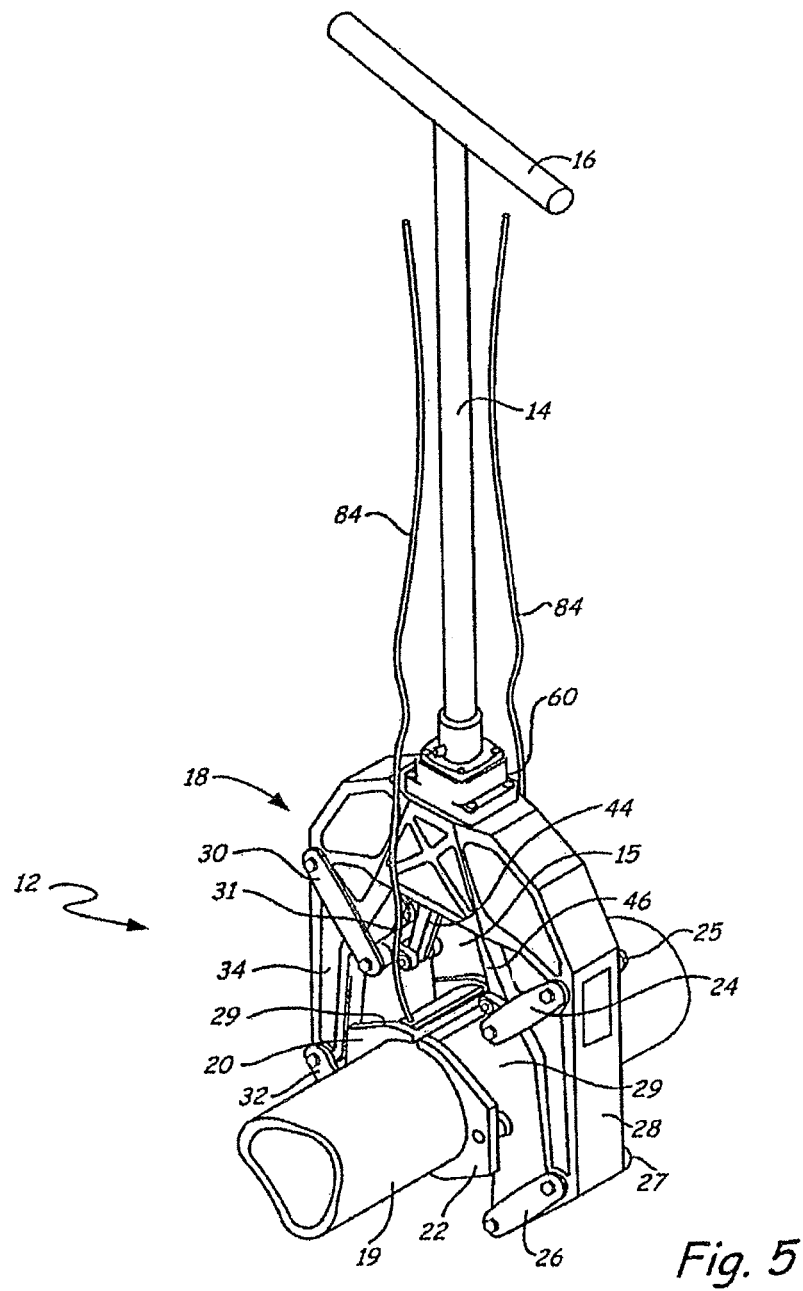
FIG. 5 is a perspective view of a clamping assembly of a clamping tool in accordance with one embodiment of the present invention in a closed position.

FIG. 5 illustrates a clamp assembly 12 with the clamping tool 10 in a closed position around a workpiece 19. First and second wires extend to the top surfaces 23 of the first and second movable jaws 20 and 22. Wires 74, to be described in more detail below, are coupled to the clamping jaws 20, 22.

As shown in FIGS. 1 through 5, the clamping tool 10 may be configured such that the working portion of the tool is adapted to contact a workpiece, for example, a tube or pipe, substantially completely around its outer diameter, and to apply a selected treatment to the workpiece.

Figure 6A:
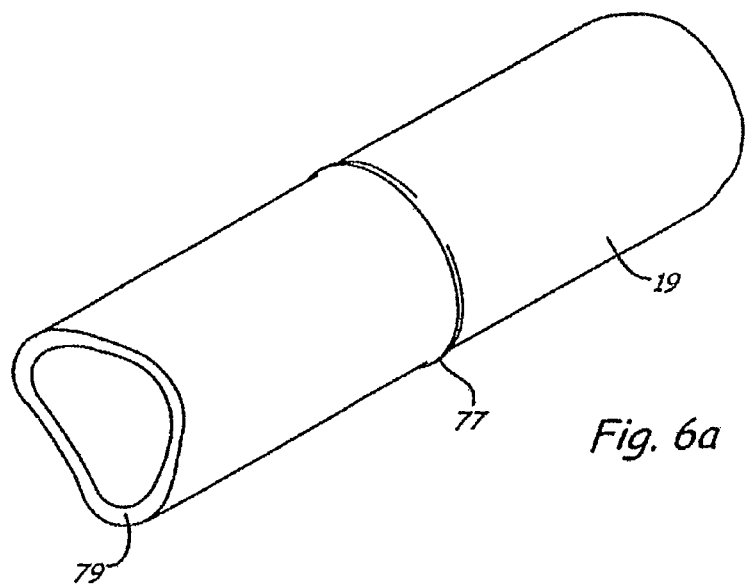
FIG. 6a is a perspective view of a workpiece with an irregular outer diameter.
Figure 6B:
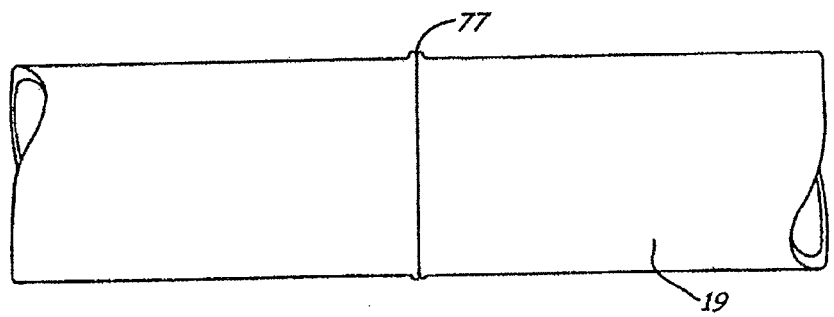
FIG. 6b is a perspective view of a workpiece comprising two sections, the workpiece having a ridge between the sections.

FIGS. 6a and 6b illustrated a workpiece 19 formed of two sections. The sections are joined at ridge 77. Additionally, FIG. 6a illustrates a workpiece 19 having an irregularly shaped outer diameter 79. A clamping tool 10 such as described with reference FIG. 1 may be used to clamp workpieces 19 having ridges 77 and/or irregularly shaped outer diameters 79. The working surfaces 21, 23 may be configured to generally conform to a cylindrical shape of a workpiece and the ridge 77 does not overly deflect the tool 10 from clamping the workpiece 10. Further, as will be described in more detail below, the tool 10 may apply a treatment to the workpiece 19. Such treatment may, for example, smooth out or minimize the ridge 77.

The tool 10 may be used to grasp a workpiece 19 having an irregularly shaped outer diameter 79 as the working surfaces 21, 23 conform generally to the shape of the outer diameter 79. It is not necessary that the working surfaces 21, 23 conform exactly to the shape of the outer diameter 79. As can be appreciated from the figures, generally cylindrically shaped working surfaces 21, 23 can snugly grasp a workpiece 19 having an irregularly shaped diameter 79 as shown in FIG. 6a. Similarly, otherwise irregularly shaped workpieces may be grasped with a tool having otherwise shaped workpiece contacting surface members as described above.

Figure 7A:
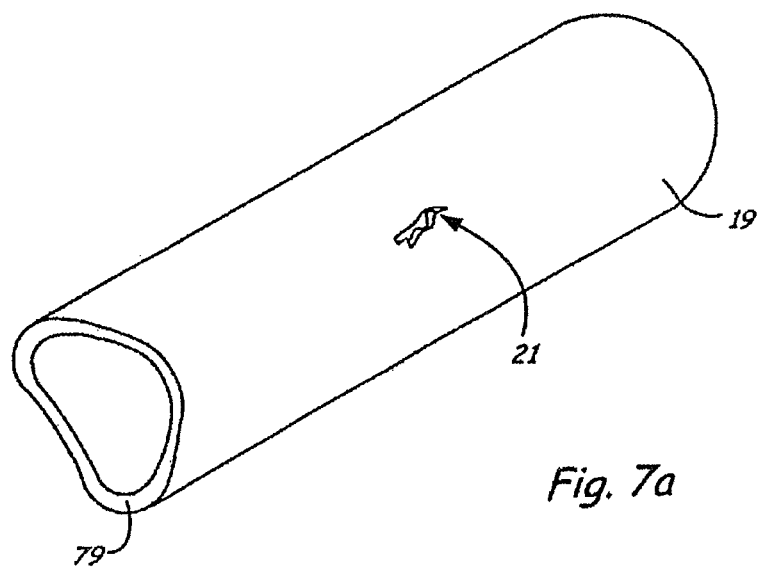
FIG. 7a is a perspective view of a workpiece having a gash in the surface thereof.
Figure 7B:
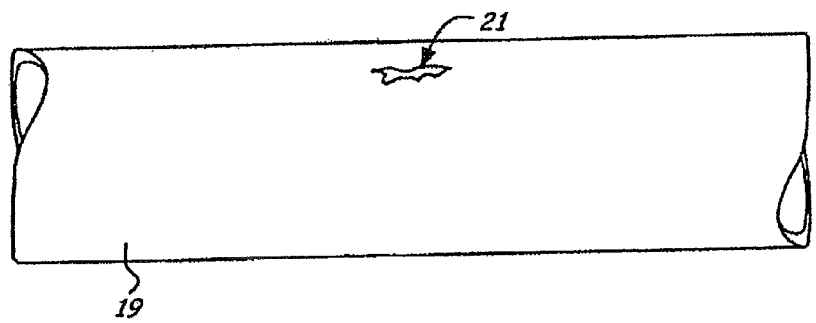
FIG. 7b is a perspective view of a workpiece having a gash in the surface thereof.
Figure 8A:
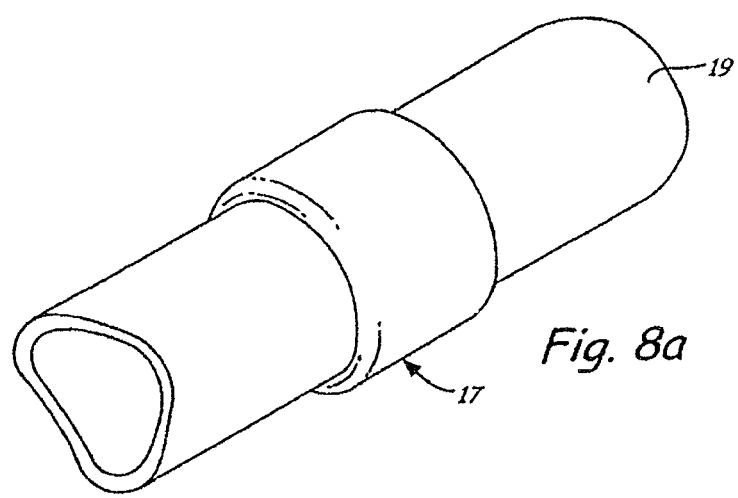
FIG. 8a is a perspective view of a workpiece with a patched section placed on the surface thereof in accordance with one embodiment of the present invention.
Figure 8B:
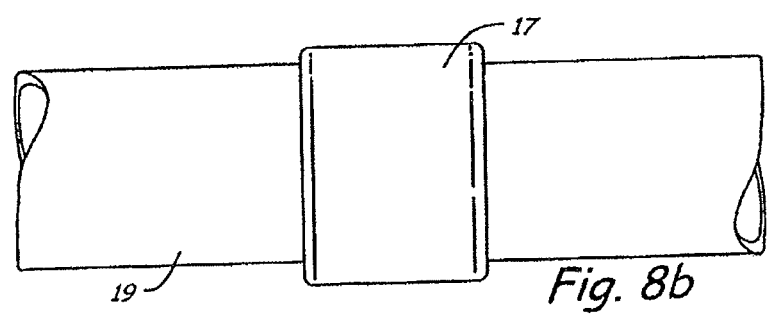
FIG. 8b is a perspective view of a workpiece with a patched section placed on the surface thereof in accordance with one embodiment of the present invention.
Figure 8C:
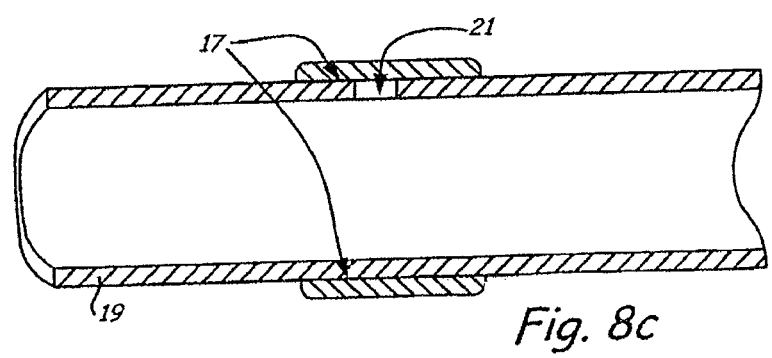
FIG. 8c is a cross-sectional view of a workpiece with a patched section placed on the surface thereof, sealing a gash in the surface of the workpiece, in accordance with one embodiment of the present invention.

FIGS. 7a and 7b illustrate perspective views of a workpiece 19 having a gash 21 in the surface thereof. Further, FIG. 7a illustrates a workpiece 19 having an irregularly shaped outer diameter 79. As shown in FIGS. 1 through 4, the clamping tool 10 may be used to apply a treatment 17 over the gash 21 of the workpiece 19. FIGS. 8a through 8c illustrate a treatment 17 placed over the gash 21 of the workpiece 19. The treatment 17 shown in FIGS. 8a through 8c is a collar. The collar may, for example, include a patch element. The patch element is designed such that it bonds securely to the workpiece 19 and seals the gash 21. Alternatively, other treatments such as heating, melting, joining, sealing, severing, compressing, deposition of a like or different material, etc. may be applied to the workpiece 19 by the clamping tool 10.

FIGS. 1 through 5 illustrate the application of the treatment 17 to the workpiece 19, from being carried into place by the tool and compressed around the workpiece 19.

In some embodiments, the workpiece contacting surfaces 21, 23 of the tool 10 may be adapted to deliver a chemical treatment or patch to a workpiece. FIG. 1 illustrates various structures for delivering a treatment to a workpiece. A gel or patch 80 may be provided on the working surface 21 of either or both movable jaws 20, 22. A quick release coating, easy release type adhesive, or other to deliver or apply a chemical or other treatment to a workpiece may be provided.

Alternatively, or additionally, the tool 10 may include structures, such as wires 84, shown in FIGS. 1 and 5 for delivering electricity, heat or other forms of energy to the too, portions thereof, the workpiece and/or a patch by carrying suitable internal or external heating or energy producing and/or transmitting elements. Thus, wires 84 may be used to deliver heat to the working surfaces of the tool. The working surfaces may become warm and subsequently warm the workpiece. Referring to FIGS. 6a and 6b, the malleability of the workpiece 19 may be increased due to the warmth delivered via the wires 84. The working surfaces 21, 22 may be used to compress the workpiece 19 in the area of the ridge 77 to minimize the ridge 77. The malleability of the workpiece 19 due to the warmth enhances the tool's ability to minimize the ridge 77. Alternately, the tool 10 may be used to minimize the ridge 77 without application of heat or other energy to the workpiece 19.

Further, the tool 10 may be provided with sensors, e.g., shown at 82 of FIG. 1, to measure and/or display the amount of pressure, heat or other treatment being applied to a workpiece. Alternatively, sensors 82 may be provided for measuring other characteristics.

Figure 9:
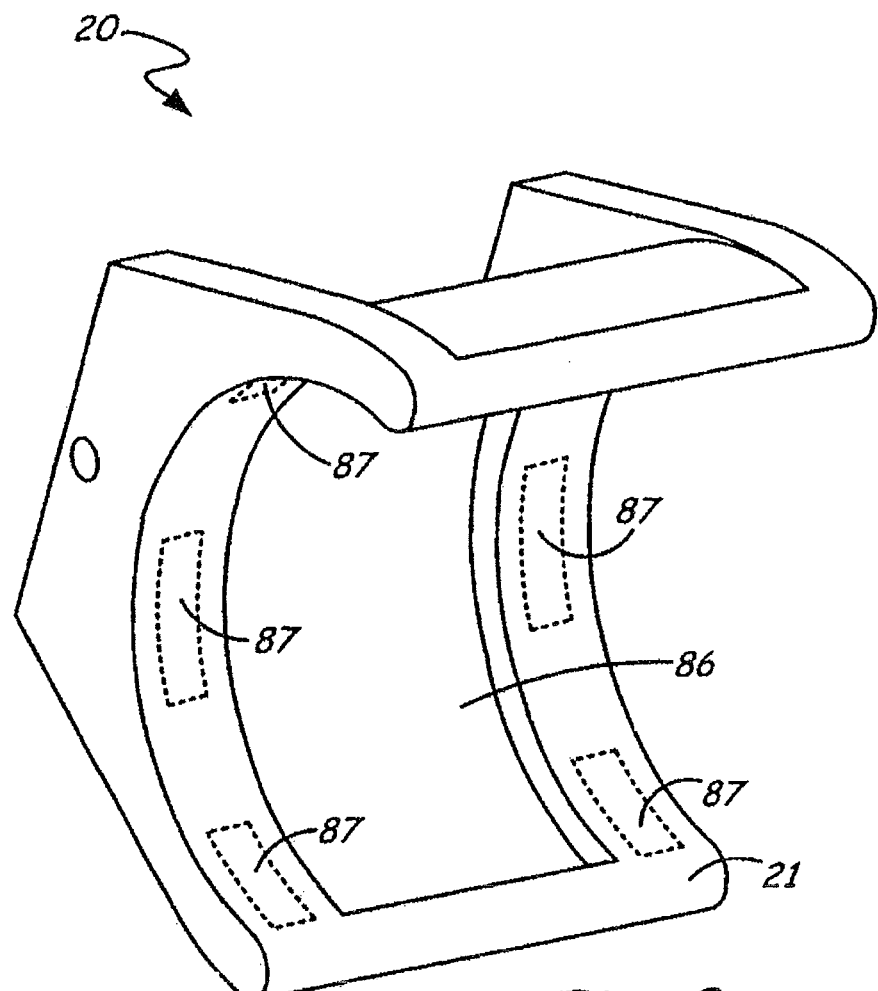
FIG. 9 illustrates a movable jaw provided with a treatment structure in accordance with one embodiment of the present invention.

FIG. 9 illustrates one embodiment a treatment delivery structure in accordance with a further embodiment of the present invention. The working surface 21 of a jaw, here the first jaw 20, is provided with a recess or relieved region 86. The relieved region 86 may be adapted to receive a chemical, in liquid, solid, or semi-solid form, to be applied to a workpiece. The relieved region 86 may extend over substantially the entire working surface of the jaw or may extend over only a portion of the working surface of the jaw.

The relieved region 86 may be surrounded by heating elements 87, which may also take the form of treatment elements, e.g., sonic horns. The selected types of elements 87 may alternately underlie or be adjacent to the relieved region 86. Also, in some embodiments, the elements 87 may be used in a jaw without a relieved region 86 in conjunction with a material to be applied to a workpiece 19. The elements 87 may be arranged in any suitable pattern depending on the treatment effect desired. Further, a single element 87 may be arranged under substantially all of the working surface of the jaw.

Figure 10:
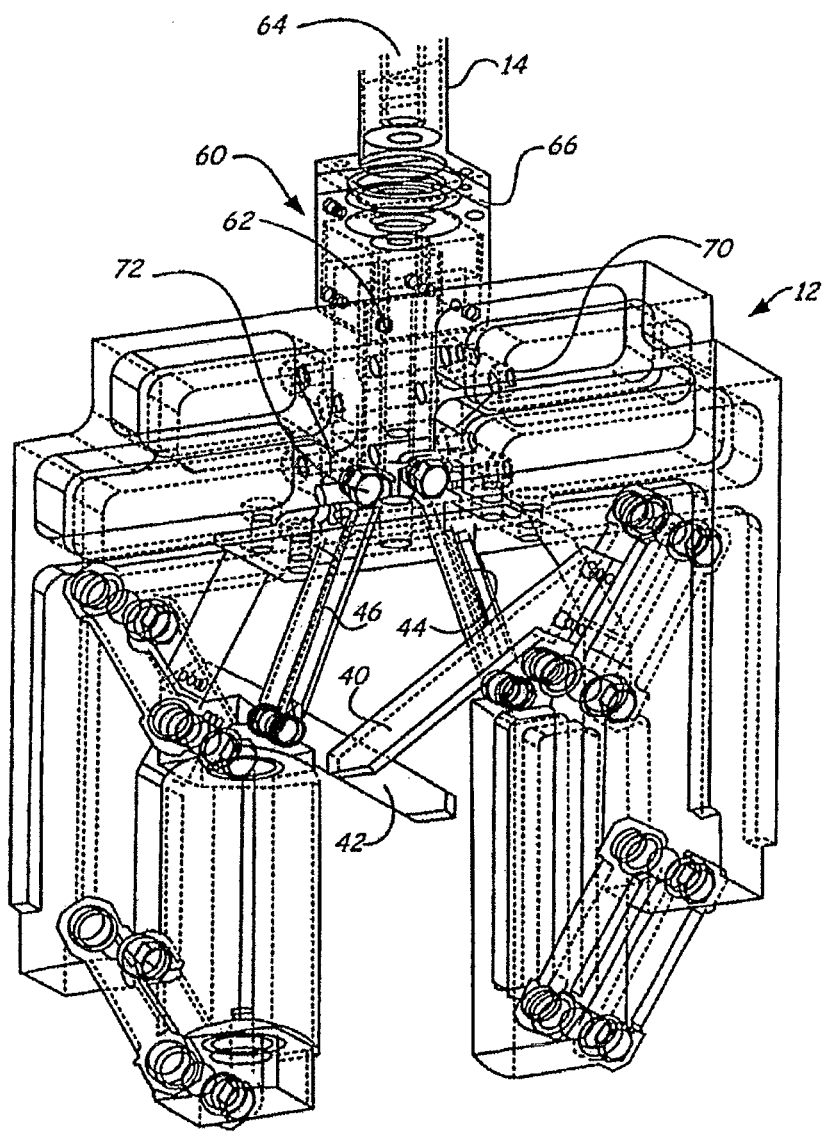
FIG. 10 illustrates a sectional view of a clamping assembly of a clamping tool in accordance with one embodiment of the present invention in an open position.

Various mechanisms may be employed to translate or operate a rotational movement of the handle 16 into a force that extends and retracts the adjusting links 44, 46. Further, a rotational movement of the handle 16 is not necessary in accordance with the present invention. FIG. 10 illustrates one example of a mechanism to operate (translate) a rotational movement of the handle into a force that extends and retracts the adjusting links. Thus, a clamping tool 10 is shown wherein a threaded rod 64 is provided within a bearing assembly 60 that is coupled with extension tube 14. The threaded rod 64 need only have threads over a portion of the rod and is coupled at one end with the handle 16. The threaded rod 64 passes through a threaded nut 66, so that rotational movement is operably changed (translated) into linear movement. The threaded rod 64 is coupled with a slider 62. The slider 62 is pivotably connected to both the adjusting links 44, 46 at couplings 70, 72 respectively. Thus, when threaded rod 64 is rotated within threaded nut 66, linear motion results, causing the slider 62 to move axially relative to the clamp base 18; that is, parallel to the longitudinal axis of the extension tube 14 (up or down as illustrated). As it moves down it moves the actuating links 44, 46 out of the clamp assembly 12. This motion causes the jaws 17 to open, as previously described. As the slider 62 is moved up, the adjusting links 44, 46 are pulled into the clamp assembly 12. This causes the jaws 17 to close. Because the adjusting links 44, 46 are pivotably coupled between the slider 62 and the jaws 17, they come together within clamp assembly 12.

Figure 11:
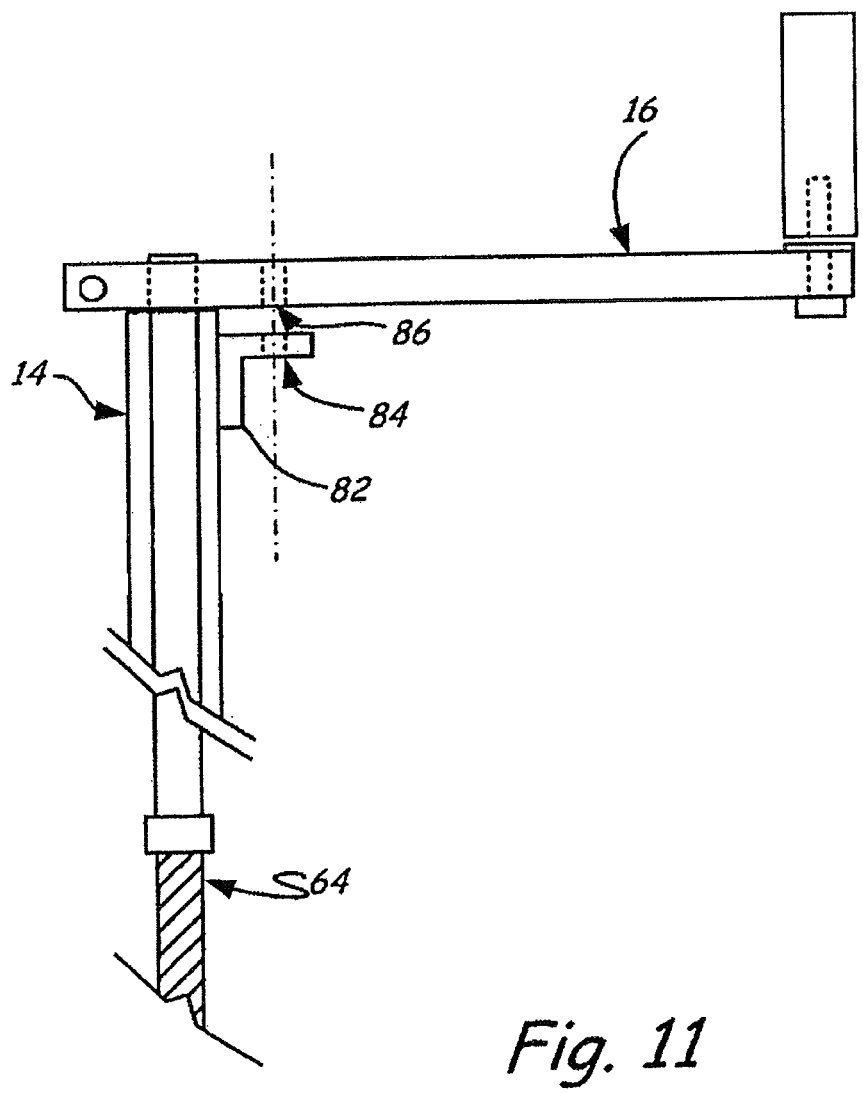
FIG. 11 illustrates a schematic view of a handle assembly with a threaded rod in accordance with one embodiment of the present invention.

FIG. 11 illustrates a handle 16 as it is coupled to the threaded rod 64 in accordance with one embodiment of the present invention. Suitable mechanisms other than threaded structures may be used to operate the tool of the present invention. For example, as known to those skilled in the art, a ratchet arrangement or a rack and pinion system may alternately be used. In a threaded arrangement, as shown in FIG. 11, an angled bar 82 may be attached to the extension tube 14. The angled bar 82 includes a lower locking hole 84 that can be aligned with an upper locking hole 86 bored through handle 16. When the two holes 84, 86 are aligned a locking member such as a padlock or any securing member can be passed through both holes 84, 86 and essentially lock the clamping tool 10. When the clamping tool 10 is locked after a pipe has been sealed, the lock will prevent the clamping tool 10 from accidentally or unintentionally being opened. Of course, other suitable handle assemblies may be used with clamping tools in accordance with the present invention.

FIG. 12-19 illustrate a clamping tool 100 according to some embodiments of the present disclosure. Particularly, FIGS. 12-15 illustrate various views of the clamping tool 100 in an open-position and FIGS. 16-19 illustrate various views of the clamping tool 100 in a closed-position. The clamping tool 100 includes a clamp base 102, a first jaw 104, and a second jaw 106, the first and second jaws 104,106 being movably coupled to the clamp base 102. For example, the first jaw 104 and the second jaw 106 may be pivotally coupled to the clamp base 102 such that the first and second jaws may be moved between an open position (FIGS. 12-15) and a closed position (FIGS. 16-19) to clamp and/or apply a selected treatment to a workpiece.

The clamp base 102 may be formed by one or more rigid, or semi-rigid suitably shaped members. For example, the clamp base 102 may be formed as one or more substantially U-shaped members 112 that define a clamp opening 108 between opposed sides of the U-shaped member(s) 112. Alternatively, the clamp base 102 may be formed as any suitably shaped member having an opening defined between opposed sides thereof. In one embodiment, the clamp base 102 may be formed as two substantially identical U-shaped members 112a, 112b coupled to one-another in substantially parallel, spaced-apart relation. The U-shaped members may be substantially solid members, or, as shown, include a plurality of openings 114 defined therein. As will be appreciated by those skilled in the art, the number, shape, and size of the openings 114 may be selected to, on the one hand, reduce the weight of the tool 100, and on the other, increase the structural integrity of the tool 100.

In various embodiments, each of the jaws 104, 106 may be formed as substantially rigid members, shaped to accommodate tubular-like objects, such as pipes or the like. Alternatively, the jaws may be formed to accommodate objects having any shape. With respect to the jaw 104, it may define a bottom end 132, a top end 134, a pair of side surfaces 133 (only one of the side surfaces 133 is shown), an outer surface 136, and an inner workpiece contacting surface 138. For purposes of brevity, only jaw 104 will be discussed in detail, it being understood that jaw 106 has substantially the same construction and operation. However, it is to be appreciated that, in some embodiments, the jaw 106 may have attributes that are different than the jaw 104, such as a different shape and/or size.

In some embodiments, the inner workpiece contacting surface 138 may be formed as a smooth, curvilinear surface. For example, as shown, the surface 138 may be formed as a smooth, generally semi-cylindrical surface. In this regard, in the closed position (FIGS. 16-19), the jaws 104, 106 may together form a generally cylindrical shape for clamping and/or compressing a workpiece.

In some embodiments, at its bottom end 132, the jaw 104 may be provided with a stepped or toothed profile that may mesh with a complementary stepped or toothed profile of the jaw 106 in the closed position. By means of this meshed engagement, a uniform compression force may be applied by the tool about substantially the entire workpiece. That is, such a meshed engagement between the ends of the jaws substantially eliminates a reduction of force that would be applied to a region of a workpiece that is proximate the abutment region of the jaws 104, 106 if the bottom ends of the jaws were provided with a linear profile.

In illustrative embodiments, one or more recesses 135 may be formed in the side surfaces 133 of the jaws 104, 106. As will be discussed in further detail below, the recesses 135 may be sized and shaped to accommodate a tab member of a diameter reducing insert carried by either or both of the jaws 104, 106 to facilitate positioning and maintaining the inserts on the jaws 104, 106.

In some embodiments, the clamp base 102 and the jaws 104, 106 may be formed of any suitable material, including metals such as aluminum, steel, tin, or any ceramic or plastic.

In illustrative embodiments (see FIGS. 17 and 18), either or both of the jaws 104, 106 may carry, on their inner surfaces an inner and/or insulating layer 103. The jaws 104, 106 may serve as support structures for the insulating layers 103. The insulating layers 103 may be adapted and formed to substantially reduce the heat transfer between the jaws 104, 106 and/or the clamp base 102 and a heated patch for application to a workpiece. The insulating layer 103 may be of suitable thickness and may cover the entire inner surfaces of the jaws 104, 106, or any portion thereof. In some embodiments, the insulating layers 103 may substantially conform to the shape of the jaws 104, 106, including the curvature of the jaws and the stepped profile. The insulating layer 103 may be fixedly held in the jaws 104, 106 by friction fitting, adhesives, welding, soldering, or any other suitable means of attachment. In some embodiments, the insulating layer 103 may be permanently coupled to the jaws 104, 106. While the insulating layers 103 may be formed of any insulating material, in one embodiment, the insulating layers 103 are formed of nylon. It should be appreciated that in embodiments in which insulating layers 103 are carried by the jaws 104, 106, the inner or facing surfaces of the insulating layers 103 form the workpiece contacting surfaces 138. In one embodiment, in the closed position, the inner diameter of the clamp formed by jaws 104, 106, including the insulating layers 103, is about 6 inches. Alternatively, the jaws 104, 106 may be dimensioned to accommodate any sized workpiece.

Figure 20:
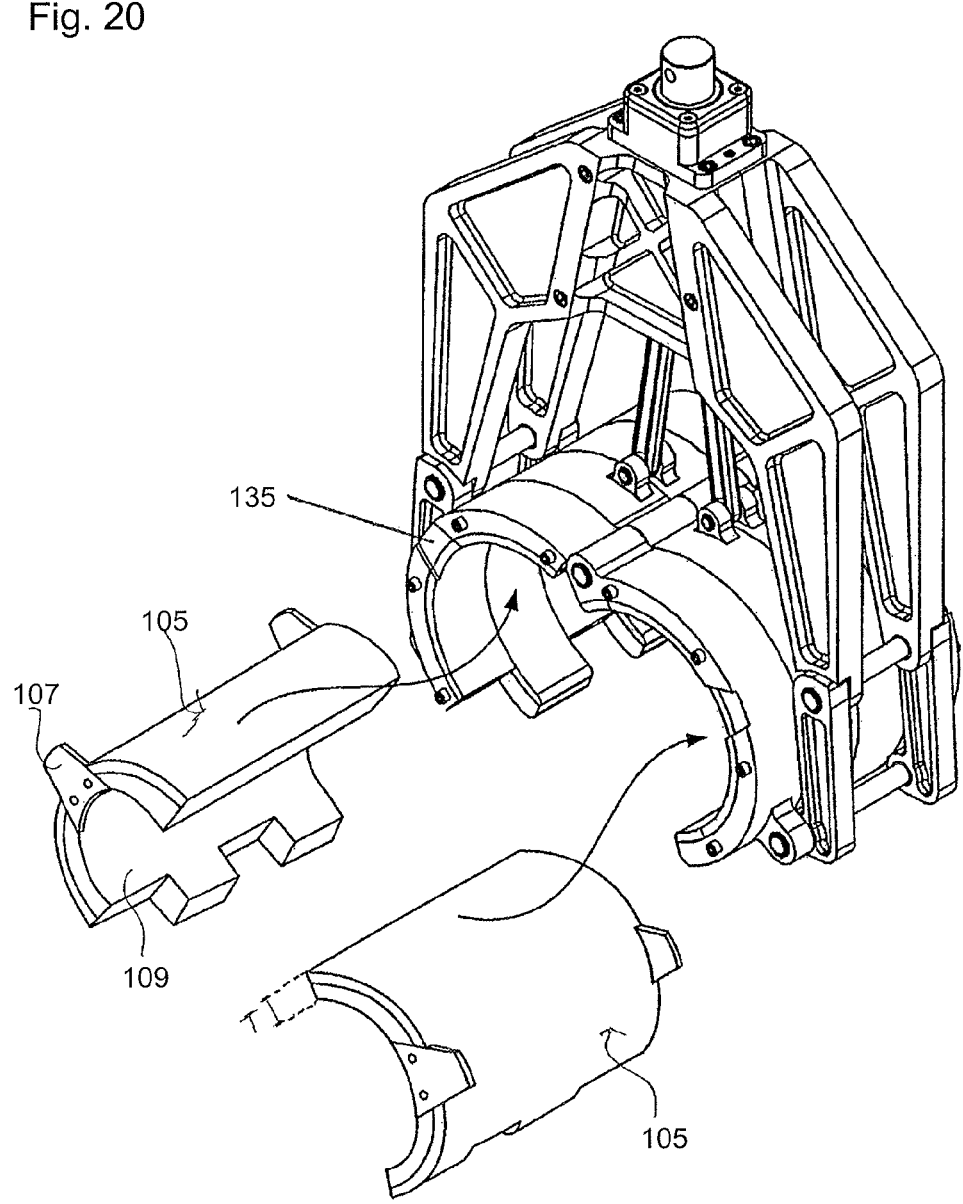
FIG. 20 is a is a perspective view of a clamping tool in accordance with some embodiments.
Figure 21:
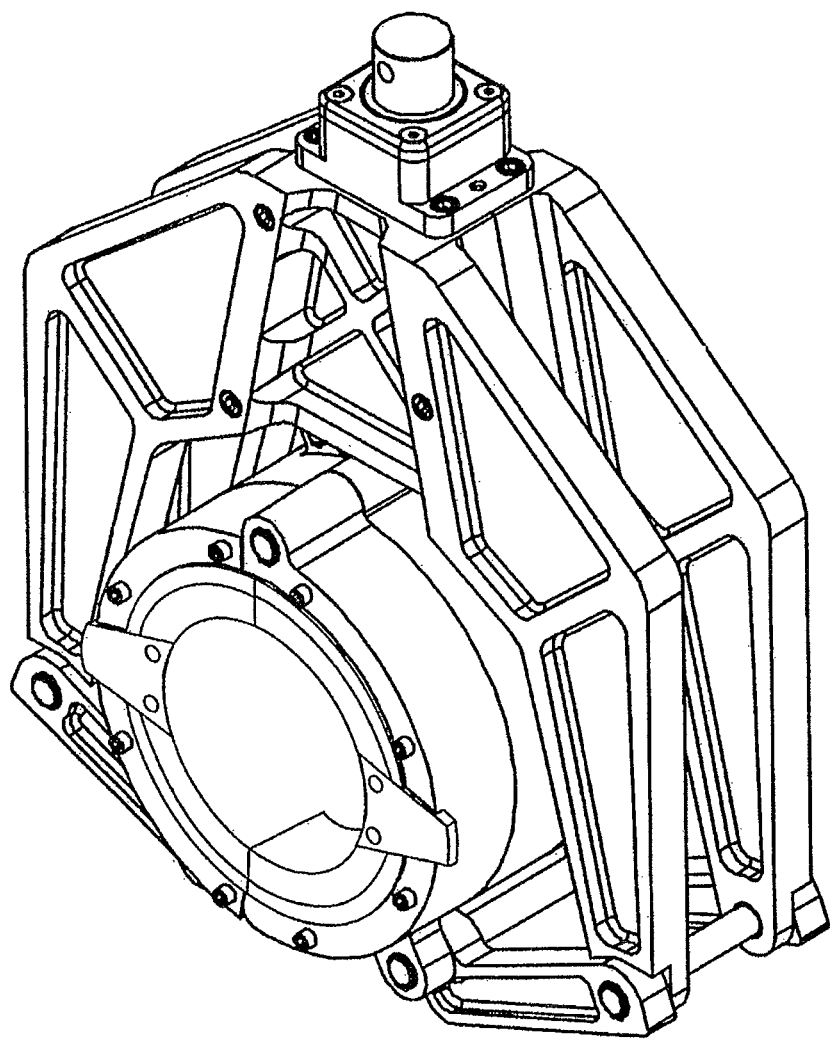
FIG. 21 is a perspective view of a clamping tool in accordance with some embodiments.

With reference to FIGS. 20-21, in some embodiments, either or both of the jaws 104, 106 may carry, on their inner surfaces (or, in embodiments in which the jaws 104, 106 carry an insulating layer 103, on the inner surfaces of the insulating layers 103), a diameter reducing insert 105. Generally, the inserts 105 may be affixed to the jaws 104, 106 to accommodate clamping and/or compressing workpieces of various sizes and/or shapes. In this regard, the inserts 105 may have a thickness "T" which is selected based on the size of a particular workpiece to be repaired. The inserts 105 may cover the entire inner surfaces of the jaws 104, 106, or any portion thereof. In some embodiments, at least one side of the inserts 105 may substantially conform to the shape of the jaws 104, 106, including the curvature of the jaws and the stepped profile of the bottom ends 132. To further facilitate insulating heat transfer between a heated patch carried by the jaws 104, 106 and the clamp base 102, the inserts 105 may also be formed from an insulating material including polyamides, e.g., nylon. For example, MC® 901 Nylon, available from Port Plastics, Inc. (Chino Hills, Calif.). Alternatively, the inserts 105 may be formed from any rigid or semi-rigid material. It should be appreciated that, in embodiments in which inserts 105 are carried by the jaws 104, 106 (or the insulating layers 103), the inner surfaces 109 of the inserts 105 form the workpiece contacting surfaces 138. As shown, the inner surfaces 109 may be formed as smooth, generally semi-cylindrical surface which, collectively, form a generally cylindrical shape for clamping and/or compressing a tubular workpiece. Alternatively, the inner surfaces 109 may be configured to complement a workpiece having any shape.

In various embodiments, the inserts 105 may be fixedly held in the jaws 104, 106 by friction fitting, adhesives, welding, soldering, or any other suitable means of attachment. In some embodiments, the diameter reducing inserts or inserts 105 may be a removable part of the tool, that is optionally used with the tool in the field. The insert 105 may be fixedly held in the jaws 104, 106 while the tool is in use, but optionally removed before or after use. In one embodiment, the inner layer 103 may be permanently fixed in the jaws 104, 106 to offer the user a tool 200 for a particular starting diameter of workpiece or pipe. In various embodiments, one or a plurality of diameter reducing inserts 105 may be used to repair one or a succession of smaller diameter workpieces. In various embodiments, the inserts 105 may be removably attached, permanently attached, or a combination of permanently attached and removably attached inserts 105. In some embodiments, the inserts 105 may include, on opposed ends thereof, one or more tabs 107 extending radially outward toward the working surfaces 138. The tabs 107 may be received in the recesses 135 formed in the side surfaces of the jaw to facilitate positioning of the inserts 105 within the jaws 104, 106 and limiting lateral movement of the inserts 105 during use.

In one embodiment, at its top end 134, the jaw 104 may be provided with one or more segments of a pin receiving passage, that may cooperate with one or more segments of a pin receiving passage on a top end of the jaw 106, to cooperatively form a pin receiving passage for operably coupling the jaws 104, 106. As shown, a pivot pin 141 may be secured within the pin receiving passage such that the jaw 104 and jaw 106 are hingedly coupled about an axis "P." Alternatively, any suitable mechanism for hingedly coupling the top ends of the jaws 104, 106 may be employed. In further alternatives, the jaws 104, 106 may be configured to pivot about the axis P without a physical coupling between the jaws 104, 106. Irrespective of the coupling between the jaws 104, 106, in some embodiments, the top ends of the jaws 104, 106 may be adapted to be in substantially abutting relationship throughout operation of the tool 100 (i.e., in positions between and including the open position and the closed position). In this manner, the overall width of the tool may be reduced, thereby facilitating operation of the tool 100 in narrow workspaces (e.g., a narrow passage, or keyhole, for accessing a segment of a workpiece to be repaired).

In some embodiments, the jaws 104, 106 may be formed as unitary, single piece members. Alternatively, as shown in FIGS. 13 and 17, the jaws 104, 106 may be formed from a plurality of jaw segments that are coupled to one another by a suitable fastening mechanism, such as fasteners, adhesives, welding, or the like.

As with previous embodiments, the clamp base 102 may include an operating mechanism (translation) mechanism (see e.g., FIG. 10) to operate (translate) a movement of a handle coupled thereto into an opening/closing movement of the jaws 104, 106. In this regard, the operating mechanism may include a handle coupling 142 disposed on an upper or top surface of the clamp base 102, which is configured to be coupled to and/or receive a handle member for transmitting a force to the operating mechanism. Also, as in previously described embodiments, the operating mechanism may be coupled to one or more adjusting links, such as a pair of adjusting links 144, that are movable under a force communicated by the operating mechanism. The adjusting links 144 may be formed as elongated, substantially rigid members having a suitable shape. While the present disclosure is described with respect to embodiments in which two adjusting links 144 are employed to effect movement of the jaws 104, 106, it is to be appreciated that one or three or more adjusting links may be employed without deviating from the scope of the present disclosure.

In one embodiment, the operating mechanism may operate (translate) a rotational movement of a handle into a linear movement of the adjusting links 144. For example, the adjusting links 144 may be substantially linearly extendable from and retractable into clamp base 102 under the force of the operating mechanism. In some embodiments, rotational movement of the handle in first direction may cause the adjusting links 144 to extend substantially linearly from the base 102, and rotation of the handle in a second direction that is opposite the first may cause the adjusting links 144 to retract substantially linearly into the base 102.

In various embodiments, the jaws 104, 106 may be pivotably coupled to the base 102, in part, via the one or more adjusting links 144. As shown, each of the adjusting links 144 may be coupled, on an end opposite the operating mechanism, to the outer surface 136 of the jaws 104, 106, for example, in a region proximate the top end 134 of the jaws. To facilitate relative pivoting movement between the adjusting links 144 and the jaws 104, 106, the coupling may include a pivot pin 146 extending through an aperture formed in a lower end of the adjusting link 144, which is pivotably secured to one or more pin receiving members 148 formed on the outer surface 136 of the jaws 104, 106. Alternatively, any coupling suitable for accommodating relative pivoting movement between the adjusting links 144 and the jaws 104, 106 may be employed.

In some embodiments, each of the jaws 104, 106 may be further pivotably coupled to the base 102, in part, via one or more linkage elements 150. For example, with respect to jaw 106, two linkage elements 150 are employed to accommodate pivoting of the jaw 106 relative to the base 102. However, it should be appreciated that one or three or more linkage elements 150 could be employed without deviating from the scope of the present disclosure. For purposes of brevity, only the linkage element 150 associated with jaw 106 will be described in detail, it being understood that jaw 104 and its corresponding linkage elements 150 have substantially the same construction and operation.

In illustrative embodiments, a top end 152 of the linkage element 128 may be pivotably coupled to a bottom end 154 of the base 102, and a bottom end 156 of the linkage element 150 may be pivotably coupled to an outer surface 158 of the jaw 106, for example, in a region proximate a bottom end 160 of the jaw 106. As shown, the pivoting movement may be carried out on the top end 152 via a pivot pin 162 secured to the base 102 and the linkage element 150, and on the bottom end 156 via a pivot pin 164 secured to the jaw 106 and the linkage element 150. Alternatively, any mechanisms suitable for facilitating pivoting movement may be employed.

In some embodiments, the jaws 104, 106 may carry on their working surfaces 138 a pipe repair element, or patch, which may be applied to a selected workpiece to, for example, reinforce the workpiece or repair a defect in the workpiece, such as a crack, gash, hole, or the like. The patches, in whole or in part, may be releasably carried by the jaws 104, 106 by friction fitting such they are readily removable from the jaws 104, 106 following application. Alternatively, any suitable attachment mechanism, such as an adhesive or mechanical coupling, may be employed. The patches may be sized and shaped to substantially conform to the working surfaces 138 of the jaws 104, 106, or alternatively, may take any size and shape suitable to repair a particular workpiece defect. For example, the patches may be sized and shaped such that when applied to a workpiece using the clamping tool 100, the patches circumferentially surround a segment of the workpiece to be repaired. Alternatively, the patches may be sized and/or shaped to only partially surround segments of the workpiece to be repaired.

In various embodiments, the patches may be formed as polymeric multi-layered patches of the type discussed in U.S. Pat. No. 8,057,895 and U.S. application Ser. No. 12/201,697, filed on Aug. 29, 2008 both of which are assigned to the assignee of the present application, and are incorporated by reference herein in their entirety. In one embodiment, the patches may have a wire mesh/grid formed of resistive material embedded therein for generating heat within the patch. As described with respect to previous embodiments, the clamping tool 100 may comprise or be coupled to an electrical system including suitable wires/leads for delivering electricity or other forms of energy to the to the patch and/or the wire mesh formed therein. As discussed in the aforementioned incorporated application, the generation of heat within or proximate to the patches may facilitate bonding of the patches to a workpiece to be repaired.

Regarding operation of the clamping tool 100, in some embodiments, the clamping tool, in its open position, can be positioned on or near and moved (e.g., lowered) onto a workpiece, such as a pipe, until an exterior of the workpiece contacts the inner working surfaces 138 of the jaws 104, 106, or such that the workpiece is positioned substantially within or between the jaws 104, 106. During lowering of the clamping tool 100, the workpiece may generally extend in an axial direction between the jaws 104, 106, and the clamping tool 100 may be brought into position in a direction generally normal to the pipes axial length.

In various embodiments, to apply a clamping force to a workpiece and/or a patch carried by the tool 100 and intended for application to the workpiece, via the jaws 104, 106 (i.e., to effect movement of the jaws 104, 106 from the open position to the closed position) a user may actuate a handle coupled to the operating mechanism, thereby retracting the adjusting links 144 into the base 102. This movement, via the couplings 120a, may be transferred to the jaws 104, 106, causing the jaws 104, 106 to be pulled toward the base 102. Concomitantly, due to the pivotable coupling between the linkage elements 150 and the jaws 104, 106, the jaws 104, 106 are pivoted about the axis P, thereby causing a space between the jaws 104, 106 to diminish. Continued retraction of the adjusting links 144 causes the space between the jaws 104, 106 to diminish until the bottom ends 132, 160 of the jaws 104, 106 are abutting. To open the jaws, the process may be reversed.

System for Repairing a Pipe

For convenience and without limitation, the tool embodiments described with reference to FIGS. 22-23, and the clamping tool 10 and the clamping tool 100 of the previously discussed embodiments, will be referred to as tool 200. In some embodiments, the present disclosure comprises a pipe-repair system including a clamp tool 200, a programmable logic controller (PLC) 214 and a patch 202. The exemplary system is used for repairing a pipe, however, any generally tubular, or cylindrical workpiece may be repaired, or any shaped workpiece may be repaired. Appropriately shaped inner layer(s) 103 or insert(s) 105 applied to the jaws 104, 106 of the tool 200.

In various embodiments, a controller, the programmable controller or programmable logic controller ("PLC") module may be an industrial grade PLC. For example, the PLC may have a waterproof casing, and be resistant to hot and cold environments.

Figure 22:
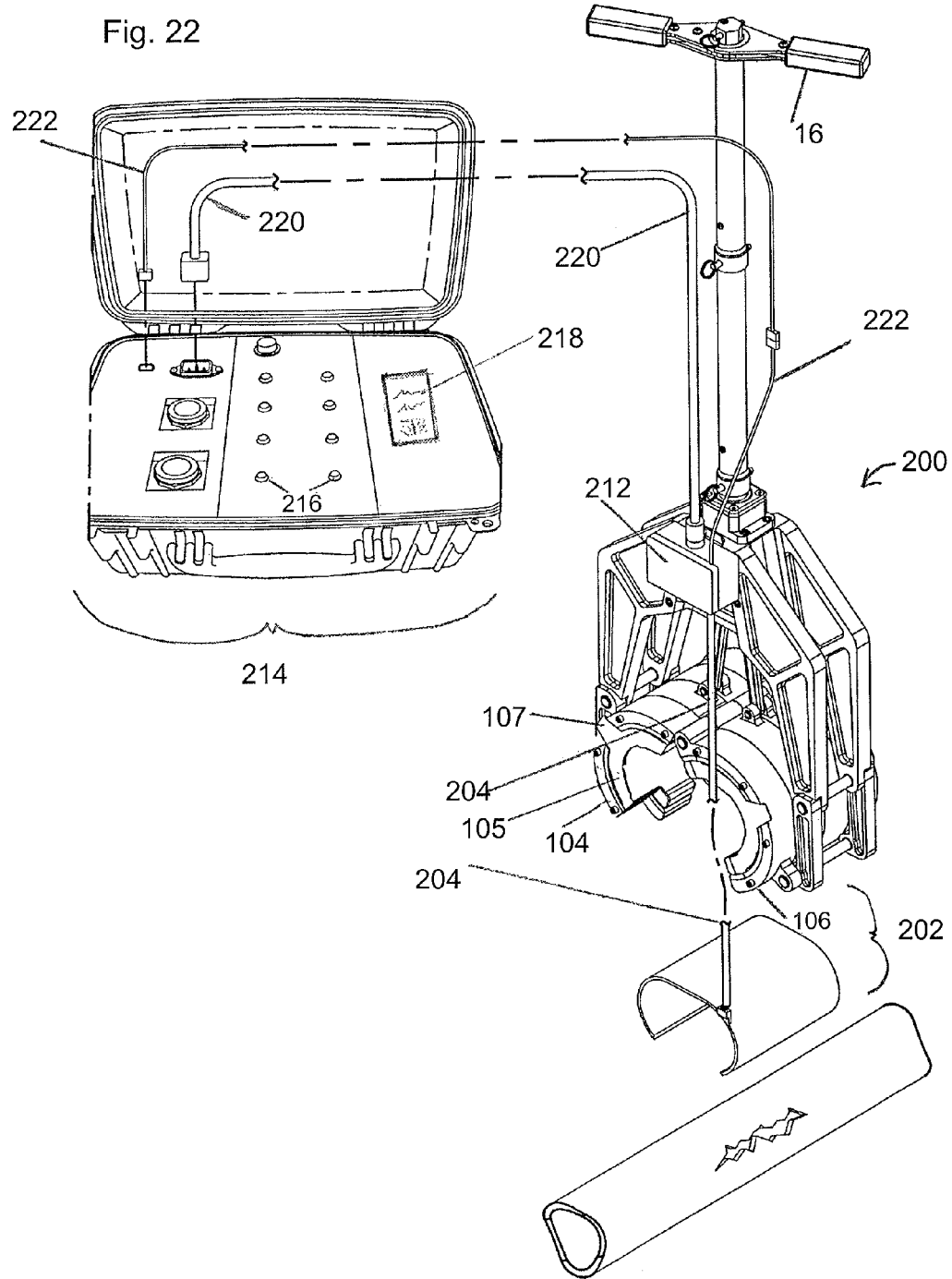
FIG. 22 is a perspective view of a clamping tool including a programmable control unit, a patch, and a workpiece having a gash in accordance with some embodiments.

As shown in FIG. 22, a PLC 214 and a patch 202, are operably coupled to the tool 200 via coupling device(s). In various embodiments, the coupling devices are one continuous coupling device or a plurality of coupling devices operably coupling the PLC 214 to the tool 200 and to the patch 202.

In some embodiments, a continuous coupling device couples the PLC to the tool and to the patch. The coupling device comprises suitable lead(s), a connector at an end of the leads and a cord that may wrap around the end of the leads. The continuous coupling device provides the leads for input and output of sensors of the patch and the power (electrical) to the PLC and the tool in the same cord. The tool further comprises clips or guides to keep the cords from becoming tangled.

In various embodiments, a plurality of coupling devices are used in the pipe-repair system. In one embodiment, the patch 202 is coupled to the tool 200 with a coupling device 204. The coupling device 204 comprises an electrical coupling device. As shown in FIG. 23, the electrical coupling device 204 comprises the lead(s) 206, a connector 208 at an end of the leads 206 and a cord 210 that may wrap around the leads 206. The connector 208 may be operably coupled in a junction box 212 carried by the clamp base 102 (as also shown in FIG. 18) of the tool 200. In various embodiments, the PLC 214 is coupled to a power source, including electrical generators, batteries, and any manner as may be standard for skilled practitioners in the field. In another embodiment, the PLC 214 comprises a safety plug. If the safety plug is disconnected from the PLC 214, the power to the PLC 214 is turned off. In one embodiment, the PLC comprises an emergency stop button.

In various embodiments, the tool 200 comprises a fail-safe mechanism or proximity switch, to ensure that the jaws of the tool are closed before starting the PLC program for the repair process. In another embodiment, the tool to patch coupling comprises a fail-safe mechanism or sensors (in the patch) to measure the temperature of the process to ensure that the sensors (RTD's) are reading within a specified tolerance. In some embodiments, a tolerance of +/−2° C. from each other (RTD). If the sensors report temperatures out of tolerance, the PLC program will stop the process.

In some embodiments, there may be at least four fail-safe mechanisms built into the system to ensure that the tool is hooked up correctly to make the repair to the workpiece. First, it may be determined if the tool jaws are closed on the workpiece. Second, it may be determined if all the coupling devices are connected. Third, it may be determined if the programmed temperature profile is achieved. Fourth, it may be determined if the heating element in the patch is working.

In some embodiments, the PLC 214 comprises a fault indicator, comprising light signals, after detection of a fault in the system. For example, output signals 216 corresponding to control, sensor, heater and/or whether or not the jaws of the tool are open, may be configured on the PLC device 214. These output signals or fault signals 216 may provide information to the user regarding problems with the pipe repair process.

In another embodiment, the junction box 212 further comprises another coupling device, a first PLC coupling device 220 that may provide a power source, e.g., electricity, to the patch 202 (e.g., for heating) relayed from the PLC module, and another coupling device, a second PLC coupling device 222 to provide output from the sensor(s) of the patch 202 to the PLC 214. These coupling devices may include lead(s), connector(s) and cord(s). Alternately, the leads (not shown) within the first PLC coupling device 220 and the second PLC coupling device 222 could be combined into one coupling device or even split into more coupling devices for convenience.

In some embodiments the junction box 212, may be an enclosure for the connection of the coupling devices 204, 220, 222. In other embodiments, the junction box 212 comprises attachments, connectors, plugs, and other components within or on said junction box 212.

In some embodiments, the PLC 214 monitors the status of one or a plurality of sensor inputs in or on the patch 202 or, in some embodiments associated with the tool. In various embodiments, the patches may be formed as polymeric multi-layered patches of the type discussed in U.S. Pat. No. 8,057, 895, U.S. application Ser. No. 12/201,697, filed on Aug. 29, 2008 and U.S. application Ser. No. 13/669,042, filed on Nov. 5, 2012, all of which are assigned to the assignee of the present application, and are incorporated by reference herein in their entirety.

In some embodiments, the tool 200, optionally, has a jaw insert, a diameter reducing insert 105, available for using the tool 200 with varying sizes of workpieces, e.g., pipes. In one embodiment, the insert 105 is nylon. In various embodiments, the nylon inserts 105 may be carried by the inner layer 103. In various embodiments, an insert 105 may be used to repair a smaller pipe than the standard size. In this example, an insert's thickness may be determined by measuring the diameter of the jaws 104, 106, carrying the inner layer 103 in closed position and subtracting the diameter of the smaller pipe to be repaired. This difference in diameter is the size of insert to select for use with the smaller pipe. The insert 105 is friction fitted to the jaws 104, 106 and the tabs 107 are seated in recesses 135 formed in the side surfaces of the jaws 104, 106. (See FIG. 20). In one embodiment, the insert 105 may overlie at least a portion of an inner layer 103 (shown in FIG. 18). The inserts 105 may be attached to the tool 200 prior to application of the tool 200 onto the pipe.

In some embodiments, the tool 200 comprises a handle 16. Various handles 16 are discussed above. Suitable mechanisms include threaded structures, ratchet arrangements, or rack and pinion systems, or other mechanisms known to those skilled in the art. In some embodiments, the clamp base 102 comprises an operating mechanism in which a movement of the handle 16, moves the jaws 104, 106. In one embodiment, the handle mechanism comprises a ratchet style mechanism. In some embodiments, the handle 16 is initially attached to maximize the opening of the jaws 104, 106 of the clamp base 102 on the tool 200 for placement upon the workpiece to be repaired. In other embodiments, the handle 16 is attached in the reverse manner to move the jaws 104,106 to a closed position on the workpiece to be repaired.

In one aspect, solvent is added to the patch 202. In various embodiments, the patch 202 comprises enough solvent to saturate an adhesive layer within the patch 202.

Figure 23:
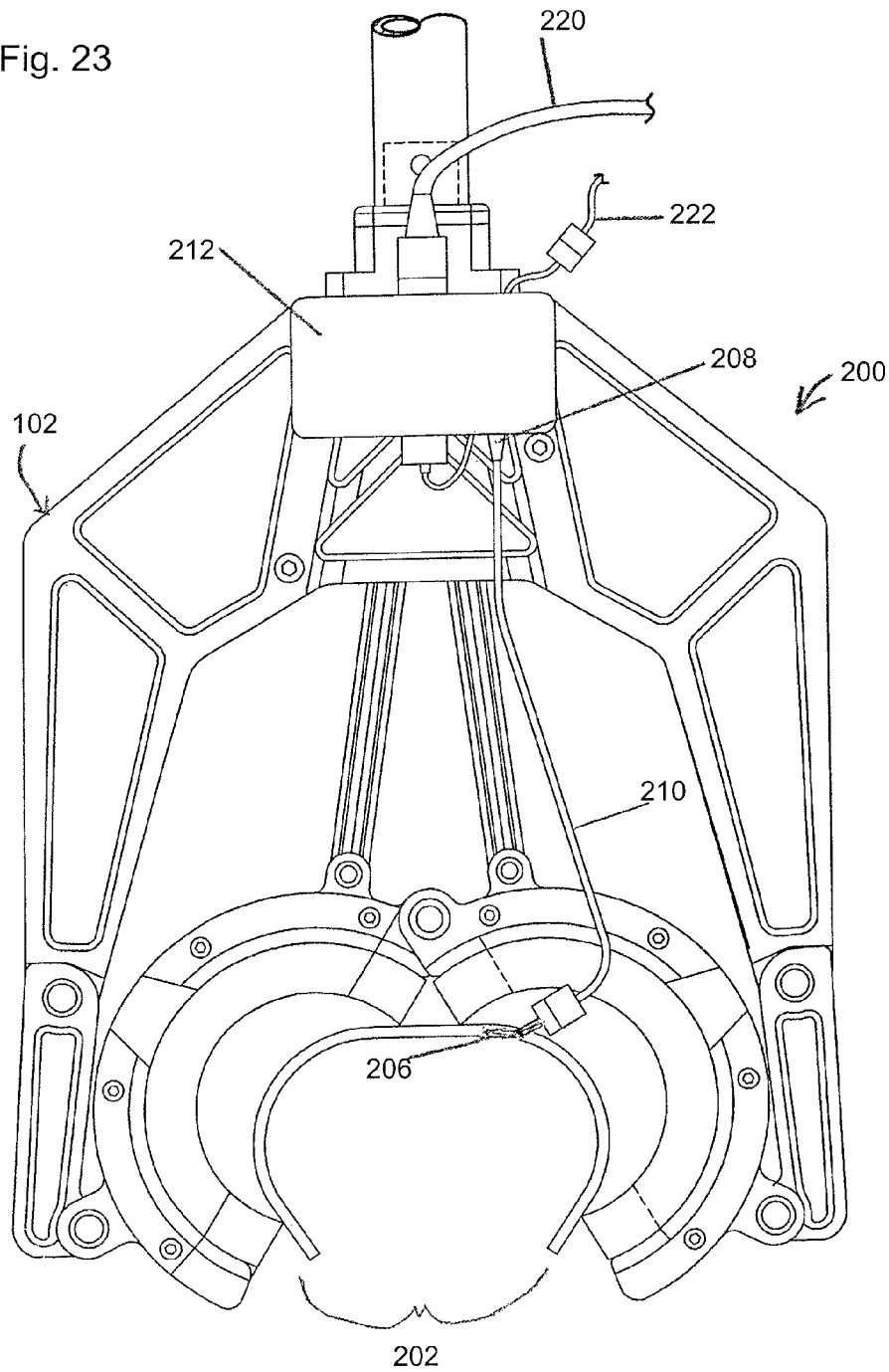
FIG. 23 is a side view of a clamping tool including a patch in accordance with some embodiments.

As shown in FIG. 23, in one embodiment, the patch 202 may be placed within the insert 105. In some embodiments, the patch 202 is carried by either or both the first 104 or the second 106 jaws (or insert(s) 105, or inner, insulating layer(s) 103 carried on said jaw(s)), depending on the desired type and size of repair.

It is to be understood by one of ordinary skill in the art if there is no insert 105, then the patch 202 is placed on the inner layer 103. For example, the workpiece may be sufficiently large in diameter as not to accommodate any inserts 105. In various embodiments, the patch 202 is placed on the surfaces, which forms the workpiece contacting surfaces 138. In some embodiments, the patch 202 is contacted by the workpiece contacting surface 138.

The patch 202, in whole or in part, may be releasably carried by the jaws 104, 106, inner layer 103, or insert 105 by friction fitting such that the patch is readily removable from workpiece contacting surface 138 of each following application. Alternatively, any suitable attachment mechanism, such as an adhesive or mechanical coupling, may be employed.

In another embodiment, the connector 208 of the coupling device 204 is plugged into the junction box 212. In this example, the other end of coupling device 204, is connected to resistance temperature detectors (RTDs) and a heating element within the patch. The heating element may include metal wire, metal mesh or wire traces or wire mesh. In various embodiments, the heating element is embedded in the patch 202.

In some embodiments, the handle 16 may be reversed to prepare the jaws 104, 106 for closing. The jaws 104, 106 of the tool are positioned over a workpiece (pipe) in need of repair and the jaws 104, 106 are closed over the pipe.

In various embodiments, the PLC 214 may use various programs or profiles for different size patches or composition of patches 202. In some embodiments, the PLC 214 may be programmed to monitor the status of multiple sensor inputs. In one embodiment, the PLC 214 may monitor the data received from sensors located in or on the patch 202. In other embodiments, sensors in the patch 202 may be monitored by the PLC 214 for various physical characteristics including temperature and pressure. In some embodiments, the PLC 214 may also send signals to elements of the patch 202 to control the physical characteristics of the patch, including temperature and pressure of the patch, e.g., turning on/off heat cycles of the heating element.

In one aspect, a program starts to run on the PLC 214. Heating times and temperatures vary with size of the patch or composition of the patches 202. In some embodiments, the repair process program comprises a plurality of phases. In one embodiment, the repair process under the control of the PLC 214 comprises three main phases. First, the ramping up of the temperature of the patch 202 over time. Second, the soaking or dwelling of the patch 202 at a given temperature over time. Third, cooling down the temperature of the patch 202 over time. Each phase may take its own amount of time. In other embodiments, phases may be repeated.

In some embodiments, output signals or indicator lights 216 on the PLC 214 advise of the steps and/or status of the pipe repair program. In other embodiments, digital displays, text displays or graphical touch screens 218 are used to report output from the PLC 214. For example, signal lights 216 comprise indicators such as, "ramp heating", "soak heating", "cooling mode" and "cycle complete". These indicators provide user-friendly information about the status of the pipe repair program.

After the PLC program is completed, in some embodiments, the handle 16 is attached in the reverse manner to open the jaws 104, 106 on the repaired workpiece. In various embodiments, the patch coupling device 204 may be cut or disconnected from the tool 200.

Method of Repairing a Pipe

In some embodiments, the present disclosure comprises a method of repairing a pipe using a clamp tool, a programmable logic controller (PLC) and a patch.

Figure 24:
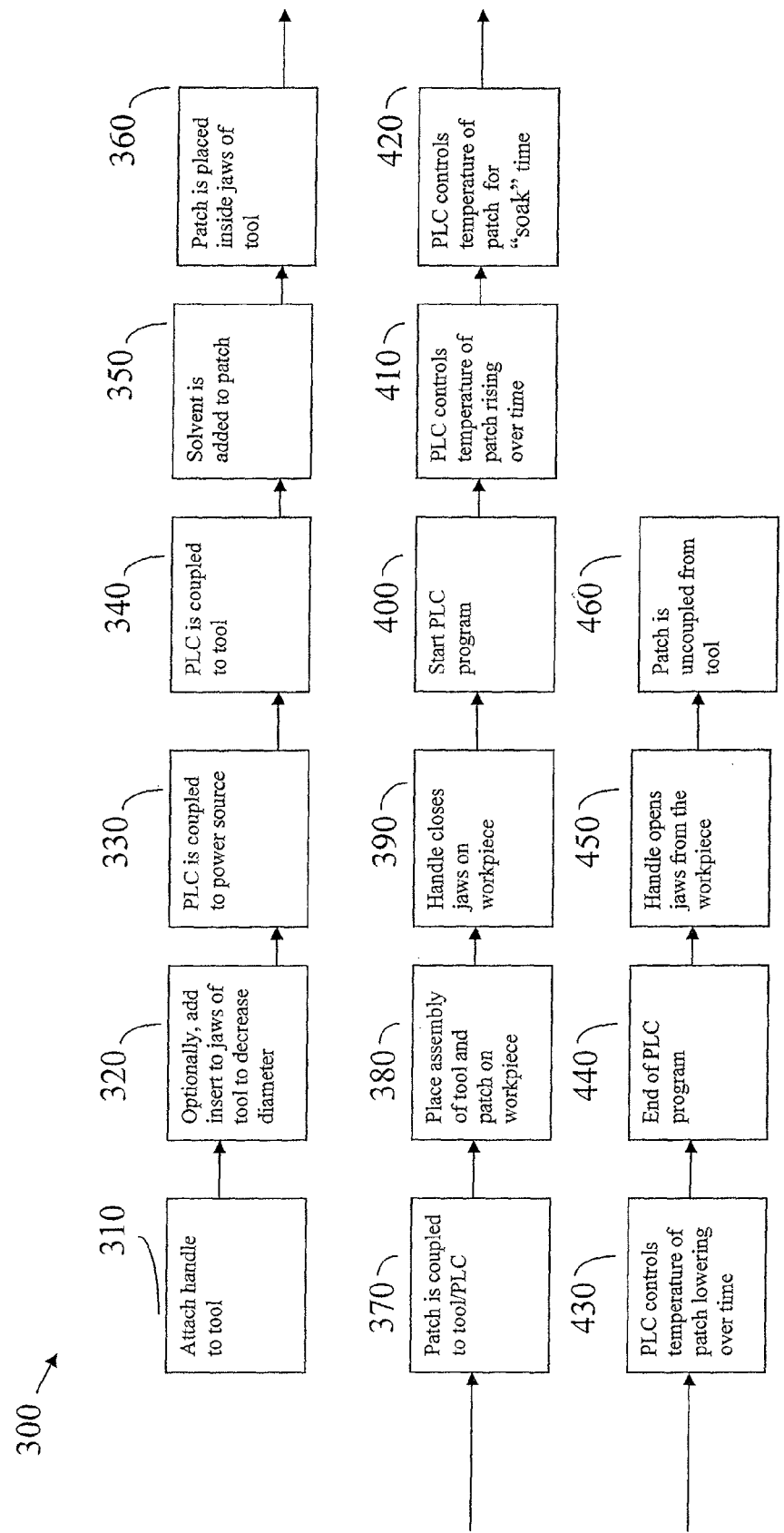
FIG. 24 is a flowchart showing a method of repairing a workpiece.

Reference is now made to FIG. 24, which depicts steps in a method 300 for repairing a pipe. In brief summary, the method 300 comprises attaching 310 a handle to a tool. Optionally, inserts 320 are added to the jaws of the tool to decrease the diameter of the tool. A PLC is coupled 330 to a power source. The PLC is coupled 340 to the tool. Solvent is added 350 to the patch. The patch is placed 360 inside jaws of tool. The patch is coupled 370 to the tool and the PLC. The assembly of the tool and the patch are placed 380 on a workpiece (pipe). The handle closes 390 the jaws on the workpiece. The PLC program is started 400. The PLC controls 410 the temperature of the patch rising over time. The PLC controls 420 the temperature for the "soak" or dwell time. The PLC controls 430 the temperature of the patch lowering over time. The PLC program ends 440. The handle opens 450 the jaws from the workpiece. The patch is uncoupled 460 from the tool.

Details of the method 300 of repairing a pipe are discussed below.

In one embodiment, the method of repairing a pipe comprises attaching a handle 16 to the tool 200. The handle 16 may be a ratchet-style handle, which opens the jaws 104,106 of the tool 200. Optionally, adding a nylon insert 105 to the inner layer 103 carried by the jaws 104, 106 to decrease the diameter of the opening of the clamp base. Using a PLC 214, operably coupled into a power source, said PLC 214 is operably coupled to the tool 200. The coupling device(s) 220, 222 may be electrical cord(s) attached to a junction box 212 on the tool 200. A patch 202 is selected for the type of repair desired, e.g., to repair a 4" diameter polyethylene pipe having a gash. A solvent is added to the patch. The patch 202 may be saturated with solvent. A patch 202 used to repair a 4" type of pipe may use about 90 cc of solvent. The solvent is selected based on the type of polymers of the patch. The patch 202 is placed on the inner surface of insert 109, which forms the workpiece contacting surfaces 138. The connector 208 of the coupling device 204 of the patch 202 is attached to the junction box 212 on the tool 200. An assembly of the tool 200 and the patch 202 is placed on the workpiece (pipe). The handle 16 operates to close the jaws 104, 106 carrying the insert 105, on the pipe with the defect, or gash. The PLC module runs a computer program to control the various phases of the repair process. For example, the program may have data about the size of the patch, the melting temperature of the polymers used, and the time to use for melting a particular patch. The PLC may read the rise of temperature over time and the internal temperature of the patch. In this example, the sensors in the patch are resistance temperature detectors (RTDs), therefore the PLC sends signals to a heating element in or on the patch to change the temperature of the heating element according to the chosen PLC program. Various phases of the PLC program include increasing the temperature of the patch over time, maintaining a temperature of the patch over time, and lowering the temperature of the patch over time. The PLC 214 may transmit data from sensors in the tool, couplings or patch to an operator or user. The PLC 214 may display to an operator or user the status output of the steps of the program. During the running of the program on the PLC 214, a series of output signals 216 or signal lights may be activated over time. In this example, the average ramping up time may take about 15 minutes. During this time an output signal 216 labelled "ramp heating" may light up. Following the ramping phase, the "soak heating" light comes on indicating that the temperature is holding (dwelling, soaking, maintaining, substantially constant) over a certain time, in this example, the average soaking time may take about 60 minutes. After the soak or dwell time is completed the program begins to drop the temperature for the cooling down phase, and the "cooling mode" signal may light up. In this example, the average cooling down time may also take about 15 minutes. At the end of the PLC program, when the PLC program is finishing, an output signal 216, such as an indicator light labeled "cycle complete" may come on indicating that it is time to remove the tool 200 from the repaired pipe. The handle 16 may be reversed to open the jaws 104, 106 from the repaired pipe. The tool 200 is uncoupled from the patch 202, applied to the workpiece. The connector 208 of the patch coupling device 204 may be disconnected from the junction box 212, or the cord 210 may be cut. The tool 200 and PLC 214 are removed from the worksite and the applied patch has repaired the defect or gash in the pipe.

Embodiments, including preferred embodiments, have been presented in this application for the purpose of illustration and description. They are not intended to be exhaustive or to limit the invention to the precise forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A tool comprising:
a clamp base having an opening;
a first jaw coupled to the clamp base with a first linkage, the first jaw comprising a first generally semi-cylindrical portion having a first curvilinear support surface, the first curvilinear support surface extending between a top end and a bottom end and shaped to complement a selected generally tubular workpiece;
a second jaw coupled to the clamp base with a second linkage, the second jaw comprising a second generally semi-cylindrical portion having a second curvilinear support surface, the second curvilinear support surface extending between a top end and a bottom end and shaped to complement a selected generally tubular workpiece;
an operating mechanism carried by the clamp base and operably coupled to the first and second jaws via one or more adjusting links;
a programmable logic controller; and
a junction box carried by the clamp base and operably connected to the controller;
wherein the one or more adjusting links are coupled at a first end to either or both of the first and second jaws and at a second end to the operating mechanism; and
wherein the first and second jaws are adapted to move, under force of the adjusting links, within the opening between an open position in which the bottom ends of the first and second jaws are spaced apart to a closed position in which said bottom ends are abutting.

2. The tool of claim 1, wherein:
the first jaw further comprises a first inner layer overlapping at least a portion of the first curvilinear support surface and defines a first workpiece contacting surface; and
the second jaw further comprises a second inner layer overlapping at least a portion of the second curvilinear surface and defines a second workpiece contacting surface.

3. The tool of claim 2, wherein the first inner layer and the second inner layer comprise an insulating material.

4. The tool of claim 3, wherein the insulating material comprises nylon.

5. The tool of claim 2, further comprising a first removable diameter insert and a second removable insert, said first removable insert overlapping at least a portion of the first workpiece contacting surface and the second removable insert overlapping at least a portion of the second workpiece contacting surface.

6. The tool of claim 1, further comprising a handle coupled to the operating mechanism, wherein the adjusting links are extendable from and retractable into the clamp assembly via movement of said handle.

7. The tool of claim 1, wherein the clamp base is generally U-shaped, and the first and second jaws are disposed proximate to an open end of the U-shaped base.

8. The tool of claim 1, wherein the bottom end of the first jaw comprises a stepped profile that meshes with a stepped profile of the second jaw such that at least a portion of the first and second jaws overlap.

9. The tool of claim 1, wherein the one or more adjusting links are coupled on their first ends to an outer surface of the first jaw or the second jaw.

10. The tool of claim 2, wherein the first and second jaws are movable within the opening such that, collectively, the first and second workpiece contacting surfaces contact a generally cylindrical workpiece substantially completely around the outer diameter of the cylindrical workpiece.

11. The tool of claim 2, further comprising a patch to be applied to the selected workpiece, the patch carried by either or both of the first and second jaws.

12. The tool of claim 11, wherein the patch is operably connected to the junction box by a coupling device.

13. The tool of claim 12, wherein the coupling device comprises one or more electrical leads, and wherein the patch further comprises a heating element embedded therein, the heating element coupled to the one or more electrical leads.

14. A system comprising:
a tool comprising:
a clamp base having an opening;
a first jaw coupled to the clamp base defining a first workpiece contacting surface;
a second jaw coupled to the clamp base defining a second workpiece contacting surface; and
a junction box carried by the clamp base;
a programmable logic controller operably connected to the junction box; and
a patch to be applied to a workpiece, operably coupled to the junction box.

15. The system of claim 14, further comprising at least one insert for use with the tool.

16. The system of claim 15, wherein a first insert overlaps at least a portion of the first workpiece contacting surface and a second insert overlaps at least a portion of the second workpiece contacting surface.

17. The system of claim 14, wherein the at least one insert comprises nylon.

18. The system of claim 15, wherein the at least one insert is removable.

19. The system of claim 15, wherein the patch is contacted by an inner surface of the at least one insert.

20. The system of claim 14, wherein the patch is operably connected to the junction box by a coupling device.

21. The system of claim 20, wherein the coupling device comprises one or more electrical leads, and wherein the patch further comprises a heating element embedded therein, the heating element coupled to the one or more electrical leads.

22. A method of repairing a pipe comprising the steps of:
providing a tool comprising jaws and a handle and operating the handle to move the jaws;
coupling a programmable logic controller to the tool;
providing a patch and adding solvent to the patch;
placing the patch in the jaws;
coupling the patch to the tool;
placing the tool carrying the patch on the pipe;
closing the jaws on the pipe by operating the handle;
starting a program on the programmable logic controller and allowing the program to run to an end, wherein the patch is attached to the pipe;
opening the jaws by operating the handle;
uncoupling the patch from the tool.

23. The method of claim 22, wherein the steps of the program comprise:
controlling the temperature of the patch rising over time;
controlling the temperature of the patch for a dwell time; and
controlling the temperature of the patch decreasing over time.

24. The method of claim 23, further comprising the step of displaying to an operator status output of the steps of the program via the programmable logic controller.

25. The method of claim 22, further comprising the step of transmitting data from sensors to an operator via the programmable logic controller.

26. The method of claim 22, further comprising the step of adding at least one insert to the jaws.

* * * * *